US008350839B2

(12) United States Patent
Ozaki

(10) Patent No.: US 8,350,839 B2
(45) Date of Patent: Jan. 8, 2013

(54) DISPLAY DEVICE AND DRIVING CONTROL METHOD FOR THE SAME

(75) Inventor: Tsuyoshi Ozaki, Fuchu (JP)

(73) Assignee: Casio Computer Co., Ltd., Tokyo (JP)

( * ) Notice: Subject to any disclaimer, the term of this patent is extended or adjusted under 35 U.S.C. 154(b) by 407 days.

(21) Appl. No.: 12/561,093

(22) Filed: Sep. 16, 2009

(65) Prior Publication Data

US 2010/0066714 A1 Mar. 18, 2010

(30) Foreign Application Priority Data

Sep. 16, 2008 (JP) ................................ 2008-237110

(51) Int. Cl.
*G06F 3/038* (2006.01)
*G09G 5/00* (2006.01)

(52) U.S. Cl. ...................................................... 345/211

(58) Field of Classification Search ........................ None
See application file for complete search history.

(56) References Cited

U.S. PATENT DOCUMENTS

| | | | | |
|---|---|---|---|---|
| 6,734,636 | B2 | 5/2004 | Sanford et al. | |
| 7,317,429 | B2 | 1/2008 | Shirasaki et al. | |
| 7,924,248 | B2 | 4/2011 | Takahara | |
| 2005/0168490 | A1 | 8/2005 | Takahara | |
| 2005/0168491 | A1* | 8/2005 | Takahara et al. | 345/690 |
| 2005/0243077 | A1 | 11/2005 | Chung et al. | |
| 2005/0253835 | A1 | 11/2005 | Kawase | |
| 2007/0018916 | A1 | 1/2007 | Kim et al. | |
| 2009/0184984 | A1 | 7/2009 | Takahara | |

FOREIGN PATENT DOCUMENTS

| | | | |
|---|---|---|---|
| CN | 1691112 | A | 11/2005 |

(Continued)

OTHER PUBLICATIONS

International Search Report and Written Opinion of the International Searching Authority dated Feb. 8, 2010 (in English) issued in counterpart International Application No. PCT/JP2009/066573.

(Continued)

*Primary Examiner* — Daniell L Negron

(74) *Attorney, Agent, or Firm* — Holtz, Holtz, Goodman & Chick, PC

(57) ABSTRACT

A display device includes a display panel having a display area in which a plurality of display pixels are two-dimensionally arranged, to display image information, a power supply driving section applying, to each of the display pixels in the display area, one of a first power supply voltage having a voltage value at which the display pixel is set to a non-display-operation state and a second power supply voltage having a voltage value at which the display pixel is set to a display operation state, and a control section controlling the power supply driving section to set a area-ratio of an first area in the display area in which the display pixels to which the first power supply voltage is applied are arranged to an second area in which the display pixels to which the second power supply voltage is applied are arranged.

14 Claims, 15 Drawing Sheets

FOREIGN PATENT DOCUMENTS

| | | | |
|---|---|---|---|
| CN | 1901766 | A | 1/2007 |
| EP | 1 930 865 | A2 | 6/2008 |
| JP | 2003-195810 | A | 7/2003 |
| JP | 2005-316382 | A | 11/2005 |
| JP | 2008-165246 | A | 7/2008 |
| JP | 2008-176115 | A | 7/2008 |

OTHER PUBLICATIONS

Japanese Office Action dated Jan. 31, 2012 (and English translation thereof) in counterpart Japanese Application No. 2008-237110.

Chinese Office Action dated Jul. 4, 2012 and English translation thereof in counterpart Chinese Application No. 200980103624.3.

* cited by examiner

DISPLAY DEVICE AND DRIVING CONTROL METHOD FOR THE SAME

CROSS-REFERENCE TO RELATED APPLICATIONS

This application is based upon and claims the benefit of priority from prior Japanese Patent Application No. 2008-237110, filed Sep. 16, 2008, the entire contents of which are incorporated herein by reference.

BACKGROUND OF THE INVENTION

1. Field of the Invention

The present invention relates to a display device including, for example, a plurality of organic electroluminescent elements arranged in a matrix, and a driving control method for the display device.

2. Description of the Related Art

Conventional self-luminous light emitting elements include, for example, organic electroluminescent elements, inorganic electroluminescent elements, and light emitting diodes (LEDs). Light-emitting element displays (display devices) are known which include a display panel in which such self-luminous light emitting elements are arranged in a matrix.

In particular, light-emitting element displays to which an active matrix driving scheme is applied have been prevailing significantly. Compared to a liquid crystal display device (LCD), the light-emitting element display exhibits a high response speed for image display and is independent from view angle. The light-emitting element display enables an increase in luminance, contrast, and image definition, a reduction in power consumption, and the like. Unlike the liquid crystal display device, the light-emitting element display requires no back light. Thus, the light-emitting element display is very advantageously characterized by enabling a further reduction in the thickness and weight of the display.

The active matrix driving scheme is applied to some of the light-emitting element displays. For these light-emitting element displays, various driving control mechanisms and methods for controlling the light emission of light-emitting elements have been proposed. For example, some known light-emitting element displays include light emitting elements for respective plural display pixels included in a display panel, and a driving circuit (hereinafter referred to as a pixel driving circuit) composed of a plurality of switching means for controlling the light emission of the light-emitting elements.

Various active driving schemes for light-emitting elements have been developed. The active driving scheme controls the light emission luminance of each of the light emitting elements for the respective plural display pixels according to a voltage value or a current value for a display signal to be written through a data line.

In general, the appropriate value of the luminance of the display varies depending on the brightness of a surrounding environment. For example, in a bright surrounding environment, human vision (eyes) gets accustomed to the bright environment. Thus, the luminance of the display is preferably relatively high. On the other hand, in a dark surrounding environment, the human vision gets accustomed to the dark environment. Thus, the luminance of the display is preferably relatively low. To allow image information displayed on the display to be easily seen by the human eyes, the luminance of the display needs to be controlled with respect to the gray level of the display data depending on the brightness of the surrounding environment.

In the conventional display, the luminance on the display panel for display data can be controlled by limiting the value of a display signal to be written to each display pixel. For example, the luminance on the display panel can be reduced by setting the maximum voltage (current) for the display signal to be written to the display pixel to a value smaller than the normal value. For example, using display signals only for low gray levels allows the maximum luminance of each display pixel to be reduced.

However, simply providing display using only low gray levels reduces the number of gray levels available for expression, thus degrading the display. Reducing the voltage value of the display signal for the maximum gray level of display data enables a reduction in the luminance on the display panel for the gray level of the display signal. However, since the voltage range is varied with gray level, the control of the voltage or the like for each gray level for each display pixel is complicated. The range over which the voltage is varied for each gray level is reduced, resulting in the need to improve the uniformity of the display panel and the reproducibility of the display signal. In this case, the variation relationship (γ characteristic) of the luminance on the display panel with the gray level value of the display panel varies, thus varying display quality.

BRIEF SUMMARY OF THE INVENTION

The present invention provides a display device enabling the luminance of a display panel to be controlled without the need to vary the gray level of image information displayed on the display panel, depending on the brightness of a surrounding environment or the like, as well as a driving control method for the display device.

A first aspect of the present invention provides a display device comprising a display panel including a display area in which a plurality of display pixels are two-dimensionally arranged along a plurality of rows and a plurality of columns, to display image information based on display data, a power supply driving section applying, to each of the display pixels in the display area, one of a first power supply voltage and a second power supply voltage, wherein the first power supply voltage has a voltage value at which the display pixel is set to a non-display-operation state and the second power supply voltage has a voltage value at which the display pixel is set to a display operation state; and a control section controlling the power supply driving section to set a area-ratio of a first area to a second area, wherein the first area is an area in the display area in which the display pixels to which the first power supply voltage is applied are arranged and the second area is an area in which the display pixels to which the second power supply voltage is applied are arranged.

A second aspect of the present invention provides a driving control method for a display device comprising providing a display panel including a display area in which a plurality of display pixels are two-dimensionally arranged along a plurality of rows and a plurality of columns, to display image information based on display data, writing a driving signal based on the display data to the display pixels which were set to a selection state, applying, to the plurality of display pixels in the display area, one of a first power supply voltage and a second power supply voltage, wherein the first power supply voltage has a voltage value at which each of the display pixels is set to a non-display-operation state and the second power supply voltage has a voltage value at which each of the display pixels is set to a display operation state; and setting a ratio of a first area to a second area in the display area, wherein the first area is an area in which the display pixels to which the first power supply voltage is applied are arranged and the second area is an area in which the display pixels to which the second power supply voltage is applied are arranged.

A third aspect of the present invention provides a display device comprising, a display panel including a display area in which a plurality of display pixels are two-dimensionally arranged along a plurality of rows and a plurality of columns, to display image information based on display data, the display area being partitioned into a plurality of partitioned display areas each comprising the display pixels corresponding to a predetermined number of rows fewer than the plurality of rows, a selective driving section sequentially setting the display pixels in each row in the display panel, to a selection state, a data driving section supplying a driving signal based on the display data to each of the display panels, a power supply driving section applying, to the plurality of display pixels in the display area, one of a first power supply voltage and a second power supply voltage, wherein the first power supply voltage has a voltage value at which each of the display pixels is set to a non-display-operation state and the second power supply voltage has a voltage value at which each of the display pixels is set to a display operation state; and a control section controlling the power supply driving section, wherein the display pixel is set to a write operation state in which the driving signal supplied by the data driving section is written when the display pixel was set to the selection state by the selective driving section, wherein the control section allows the power supply driving section to apply the first power supply voltage to a first display area comprising one of the plurality of partitioned display areas including the display pixels which are set to the write operation state, wherein during a write period when the driving signal is written to each of the display pixels included in the first display area, the control section allows the power supply driving section to apply the first power supply voltage and the second power supply voltage at not overlapping timing, to at least one particular partitioned display area included in second display areas corresponding to the plurality of partitioned display areas except the first display area, wherein throughout the write period, the control section allows the power supply driving section to apply one of the first power supply voltage and the second power supply voltage to the display pixels in a third display area corresponding to the second display areas except the particular partitioned display area, and wherein the control section sets a ratio of a first time to a second time wherein the first time is a time for which the first power supply voltage is applied to the particular partitioned display area and the second time is a time for which the second power supply voltage is applied to the particular partitioned display area, and a area-ratio of a first area to a second area, wherein the first area is an area in which the display pixels in the third display area to which the first power supply voltage is applied are arranged and the second area is an area in which the display pixels in the third display area to which the second power supply voltage is applied are arranged.

A fourth aspect of the present invention provides a driving control method for a display device comprising, providing a display panel including a display area in which a plurality of display pixels are two-dimensionally arranged along a plurality of rows and a plurality of columns, to display image information based on display data, the display area being partitioned into a plurality of partitioned display areas each comprising the display pixels corresponding to a predetermined number of rows fewer than the plurality of rows, setting the display pixels in a selection state, to a write state and writing a driving signal based on the display data, to the display pixels, applying, to a first display area comprising one of the plurality of partitioned areas including the display pixels which are set to the write operation state, a first power supply voltage including a voltage value at which the display pixels are set to a non-display-operation state, then during a write period in which the driving signal is written to the display pixels included in the first display area, applying the first power supply voltage and a second power supply voltage including a voltage value at which the display pixels are set to a display operation state at not overlapping timing, to at least one particular partitioned display area included in second display areas corresponding to the plurality of partitioned display areas except the first display area, then throughout the write period, applying one of the first power supply voltage and the second power supply voltage to the display pixels in a third display area corresponding to the second display areas except the particular partitioned display area; and setting a ratio of a first time to a second time, wherein the first time is a time for which the first power supply voltage is applied to the particular partitioned display area and the second is a time for which the second power supply voltage is applied to the particular partitioned display area, and a area-ratio of an first area to a second area, wherein the first area is an area in which the display pixels in the third display area to which the first power supply voltage is applied are arranged and the second area is an area in which the display pixels in the third display area to which the second power supply voltage is applied are arranged.

DETAILED DESCRIPTION OF THE INVENTION

Embodiments of a display driving device and a driving control method for the display driving device according to the present invention will be described below in detail with reference to the drawings.

<First Embodiment>

Figure 1:
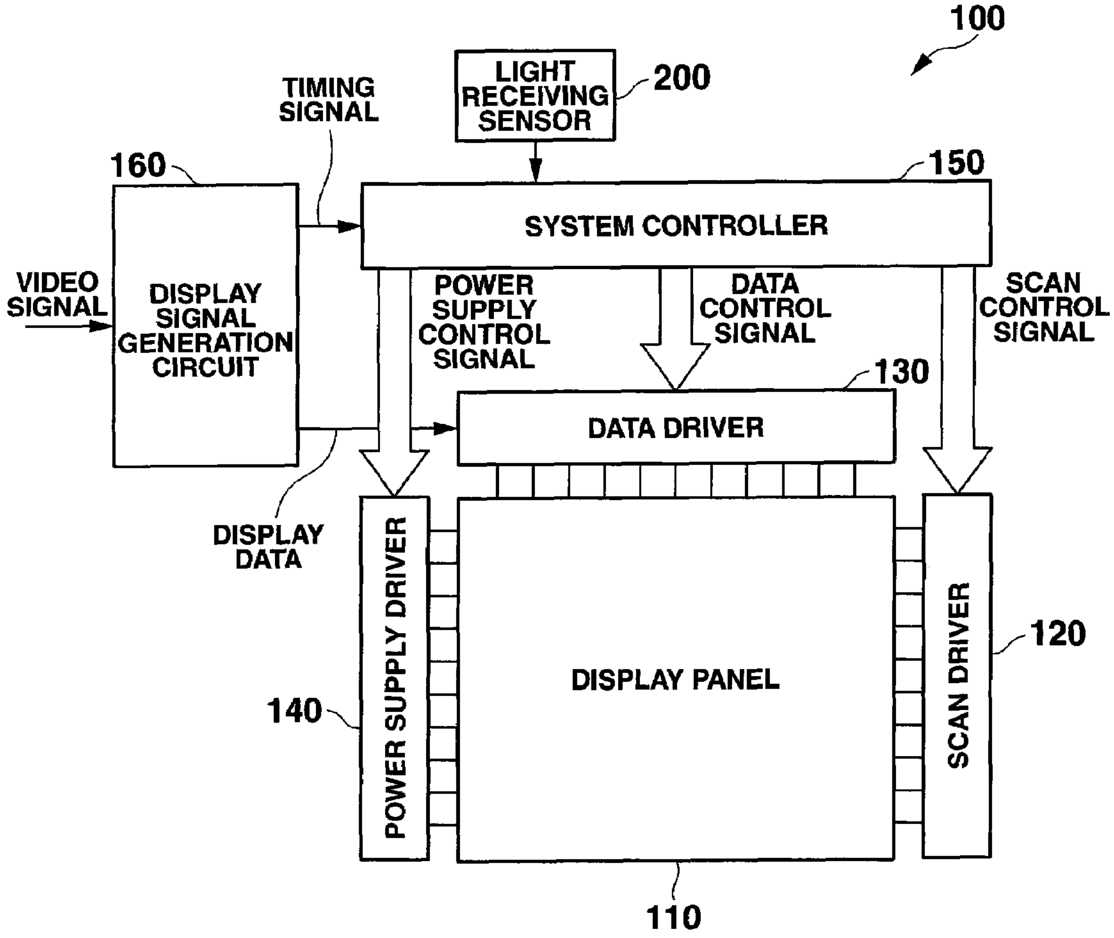
FIG. 1 is a diagram showing the general configuration of a first embodiment of a display panel driving device according to the present invention.
Figure 2:
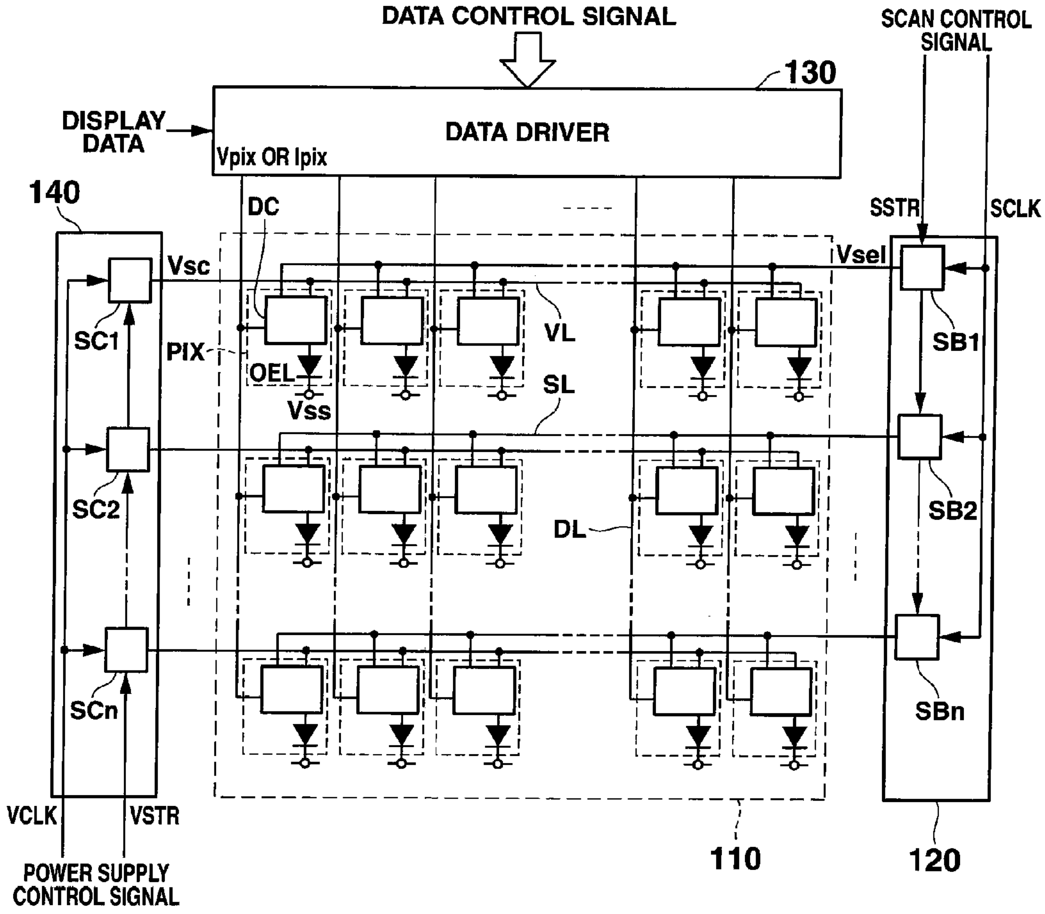
FIG. 2 is a diagram showing the configuration of a display panel and drivers in the device.

First, a first embodiment of the present invention will be described. FIG. 1 is a diagram showing the general configuration of a display panel driving device. FIG. 2 is a diagram showing the configuration of a display panel and drivers in the display panel driving device.

A display panel driving device (display device) 100 includes a display panel (pixel array) 110. A plurality of scan lines SL, a plurality of power supply lines VL, and a plurality of data lines (signal lines) DL are arranged in the display panel 110. The plurality of scan lines SL are disposed parallel to one another. The plurality of power supply lines VL are disposed along the scan lines. The plurality of data lines DL cross the scan lines SL and the power supply lines VL at right angles.

A plurality of display pixels PIX are arranged near the respective intersecting points between the scan line L and the power supply line VL and the plurality of data lines DL. Each of the plurality of display pixels PIX is composed of a pixel driving circuit DC and an organic electroluminescent element (light emission element) OEL. The display pixels FIX are arranged in the display panel (pixel array) 110. Areas in each of which a plurality of display pixels PIX are arranged correspond to display areas.

The display panel driving device 100 includes a scan driver (scan driving means) 120, a data driver (signal driving means) 130, a power supply driver (power supply driving means) 140, a system controller 150, and a display signal generation circuit 160.

The scan driver 120 is connected to the scan lines SL in the display panel 110. The scan driver 120 sequentially applies a scan signal Vsel of a high level to each of the scan lines SL at a predetermined timing to controllably set the display pixels PIX in each row (line) to a selection state.

The data driver 130 is connected to the data lines DL in the display panel 110. The data driver 130 supplies a display signal (gray level voltage Vpix) corresponding to display data, to each of the data lines DL. When the display signal supplied by the data driver 130 is a voltage signal, the display signal is the gray level voltage Vpix. Alternatively, the display signal supplied by the data driver 130 may be current signal. In this case, the display signal is a gray level current Ipix.

In the description below, essentially, the display signal supplied by the data driver 130 is a voltage signal; the display signal is the gray level voltage Vpix. Even when the display signal is a current signal, each section of the display panel driving device 100 operates in substantially the same manner.

The power supply driver 140 is connected to the power supply lines VL disposed parallel to the scan lines SL in the display panel 110. The power supply driver 140 sequentially applies a power supply voltage Vsc of a high level or a low level to each of the power supply lines VL at predetermined timings. The power supply driver 140 controls the amount of write current to the display pixels PIX through the data line DL and the amount of driving current flowing through each of the power supply lines VL to the organic electroluminescent elements DEL of the display elements PIX.

The system controller 150 generates a scan control signal, a data control signal, and a power supply control signal based on a timing signal supplied by the display signal generation circuit 160. The system controller 150 supplies the scan control signal, the data control signal, and the power supply control signal to the scan driver 120, the data driver 130, and the power supply driver 140, respectively, to control the operational state of the drivers 120, 130, and 140.

For example, a light receiving sensor 200 is connected to the system controller 150. The light receiving sensor 200 detects the brightness of a surrounding environment. The system controller 150 controls the duty ratio required to control the display luminance of the display panel 110 according to the brightness of the surrounding environment detected by the light receiving sensor 200.

The display signal generation circuit 160 generates display data based on video signals from a source located outside the display device 100. The display signal generation circuit 160 the display data to the data driver 130. Concurrently, the display signal generation circuit 160 generates or extracts a timing signal (system clock or the like) required to display the generated display data on the display panel as an image. The display signal generation circuit 160 supplies the timing signal to the system controller 150.

Now, the configuration of the display panel 110 will be described.

In the display panel 110, a plurality of the display pixels PIX are two-dimensionally arranged in a matrix along a plurality of rows and a plurality of columns. As shown in FIG. 2, each of the display pixels PIX has a pixel driving circuit DC and an organic electroluminescent element OEL. The pixel driving circuit DC controls a write operation on the display pixel PIX and the light emission operation of the organic electroluminescent element based on a scan signal Vsel applied by the scan driver 120 through the scan line SL, the display signal (gray level voltage Vpix) supplied by the signal driver 130 through the data line DL, and the power supply voltage Vsc applied by the power supply driver 140 through the power supply line VL.

The organic electroluminescent element OEL is supplied with a driving current through the power supply line VL based on the gray level voltage Vpix written to the display pixel PIX. The organic electroluminescent element OEL thus emits light. The light emission luminance of the organic electroluminescent element OEL is controlled according to the current value of the driving current.

The display pixel PIX is said to be in a display operation state when the organic electroluminescent element OEL is in a light emission operation state in which the organic electroluminescent element OEL emits light at a luminance corresponding to the current value of the driving current. The display pixel PIX is said to be in a non-display state when the organic electroluminescent element DEL is supplied with no driving current and is in a non-light-emission state.

The pixel driving circuit DC generally controllably sets the display pixel PIX to a selection state or a non-selection state according to a scan signal. In the selection state, the pixel driving circuit DC receives and holds the gray level voltage Vpix corresponding to the display data. In the non-selection state, the pixel driving circuit DC passes the driving current corresponding to the voltage level of the held gray level voltage Vpix, through the power supply line VL to the organic electroluminescent element DEL. The organic electroluminescent element DEL thus emits light (light emission operation state).

The scan driver 120 sequentially applies the scan signal Vsel of the high level to each of the scan lines SL based on a scan control signal supplied by the system controller 150. Thus, the scan driver 120 sets the display pixels PIX in the row (line) to the selection state. The scan driver 120 writes the gray level voltage Vpix based on the display data supplied by the data driver 130 through the data line DL, to the display pixel PIX.

Specifically, as shown in FIG. 2, the scan driver 120 generally includes a plurality of shift blocks SB1, SB2, . . . , SBn in association with the respective scan lines SL. Each of the shift blocks SB1, SB2, . . . , SBn is composed of a shift register and a buffer.

The scan driver 120 allows a shift register to sequentially shift from the top to bottom of the display panel 110 based on scan control signals supplied by the system controller 150. The scan driver 120 simultaneously generates shift outputs. The scan control signals include a scan start signal SSTR and a scan clock signal SCLK. The scan driver 120 applies the shift output to each of the scan lines SL via a buffer as the scan signal Vsel of a predetermined voltage level (high level).

The data driver 130 receives and holds display data supplied by the display signal generation circuit 160 at predetermined timings based on data control signals supplied by the system controller 150. The control signals include an output enable signal OE, a data latch signal STB, a sampling start signal STR, and a shift clock signal CLK. The data driver 130 supplies each of the data lines DL with the gray level voltage Vpix (or gray level current IPix) corresponding to the display data held at the predetermined timings.

The system controller 150 transmits, to the scan driver 120, a scan control signal controlling the operational state of the scan driver 120. The system controller 150 thus allows the scan driver 120 to operate at a predetermined timing to generate a scan signal Vsel.

The system controller 150 transmits, to the data driver 130, data control signals controlling the operational state of the data driver 130. The system controller 150 thus allows the data driver 130 to operate at a predetermined timing to generate a gray level voltage Vpix. The data control signals include a scan shift start signal SSTR, a scan clock signal SOLE, a shift start signal STR, a shift clock signal CLK, a latch signal STB, and an output enable signal OE.

The system controller 150 transmits, to the power supply driver 140, power supply control signals controlling the operational state of the power supply driver 140. The system controller 150 thus allows the power supply driver 140 to operate at a predetermined timing to generate a power supply voltage Vsc. The power supply control signals include a power supply start signal VSTR and a power supply clock signal VCLK.

Thus, the system controller 150 allows the scan driver 120, the data driver 130, and the power supply driver 140 to output the scan signal Vsel, the gray level voltage Vpix, and the power supply voltage Vsc, respectively. The system controller 150 thus allows each of the pixel driving circuits DC to perform a driving control operation (a driving control method for the display device) to display image information based on a predetermined video signal, on the display panel 110.

Based on the power supply control signal supplied by the system controller 150, the power supply driver 140 applies one of a power supply voltage of a low level Vscl, for example, a voltage level equal to or lower than ground potential, or a power supply voltage of a high level Vsch, to each of the power supply lines VL. That is, in synchronism with a timing when the scan driver 120 sets the organic electroluminescent element OEL to the selection state and a timing when the organic electroluminescent element OEL of the display pixel PIX is set to the non-light-emission operation state, the power supply driver 140 applies the power supply voltage of the low level Vscl, for example, the voltage level equal to or lower than ground potential, to the power supply line VL corresponding to the display pixel PIX. Thus, a write current (sink current) Ia is drawn toward the data driver 130 through the power supply line VL via the display pixel PIX (pixel driving circuit DC). The magnitude of the write current Ia corresponds to the gray level voltage Vpix based on the display data.

On the other hand, in synchronism with a timing when the organic electroluminescent element OEL of the display pixel PIX is set to the light emission operation state, the power supply driver 140 applies the power supply voltage of the high level Vsch to the power supply line VL corresponding to the display pixel PIX. Thus, a driving current Ib flows toward the organic electroluminescent element OEL through the power supply line VL via the display pixel PIX (pixel driving circuit). The magnitude of the driving current Ib corresponds to the gray level voltage Vpix based on the display data.

As shown in FIG. 2, like the scan driver 120, the power supply driver 140 generally includes a plurality of shift blocks SC1, SC2, . . . , SCn in association with the respective power supply lines VL. Each of the shift blocks SC1, SC2, . . . , SCn is composed of a shift register and a buffer. Based on power supply control signals synchronizing with the scan control signals supplied by the system controller 150, the power supply driver 140 allows a shift register to sequentially shift from the top to bottom of the display panel 110, while generating shift outputs. The power supply control signals include anode control data ASD and a power supply clock signal VCLK. The power supply driver 140 applies the generated shift output to each of the power supply lines VL via a buffer as the power supply voltage with the predetermined voltage level Vscl or Vsch.

The display signal generation circuit 160 is supplied with video signals from, for example, a source located outside the present display device. The display signal generation circuit 160, for example, extracts a luminance gray level signal component from the video signal from the source located outside the present display device. The display signal generation circuit 160 supplies the extracted gray level signal component to the data driver 130 for every row in the display panel 110.

Like television broadcasting signals (composite video signals), the video signal may contain a timing signal component defining a display timing form image information. The display signal generation circuit 160 may provide not only the function of extracting a luminance gray level signal component from the video signal but also the function of extracting the timing signal component from the video signal and supplying the extracted timing signal component to the system controller 150. In this case, the system controller 150 generates, based on timing signals supplied by the display signal generation circuit 160, a scan control signal, a data control signal, and a power supply control signal which are to be supplied to the scan driver 120, the data driver 130, and the power supply driver 140.

Figure 3:
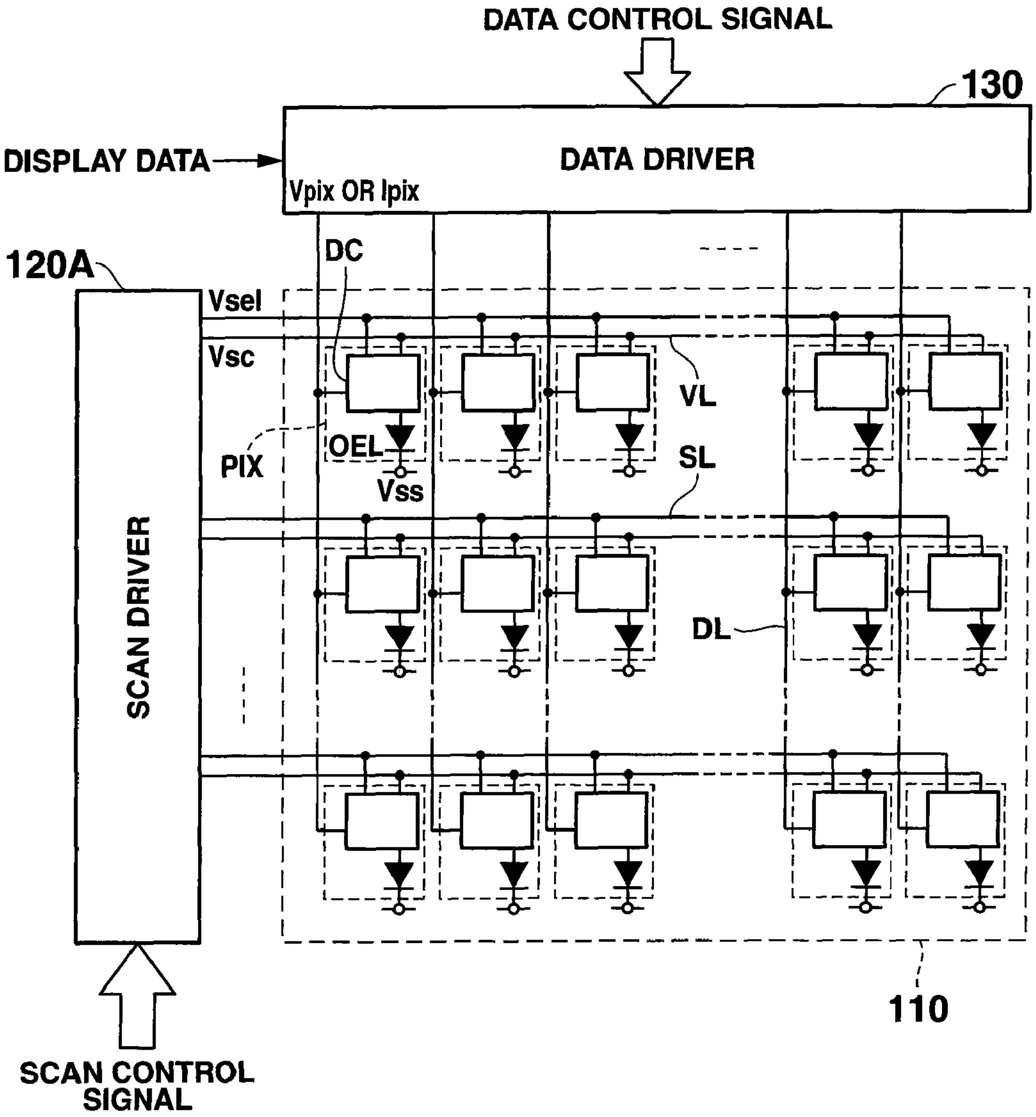
FIG. 3 is a diagram showing the configuration of a modification of the display panel and drivers in the device.

In the present embodiment, the scan driver 120, the data driver 130, and the power supply driver 140 are individually arranged around the periphery of the display panel 110 as shown in FIGS. 1 and 2. The present embodiment is not limited to this aspect. FIG. 3 is a diagram of the configuration of a modification of the display panel and drivers in the display panel driving device according to the first embodiment. A scan driver 120A may provide both the function of generating and applying a scan signal Vsel to each of the scan lines SL and the function of generating and applying a power supply voltage Vsc to the power supply line VL. The scan driver 120A may be located on one side of the display panel 110.

Now, a specific example of the configuration of the pixel driving circuit DC applied to the display pixel FIX will be described.

Figure 4:
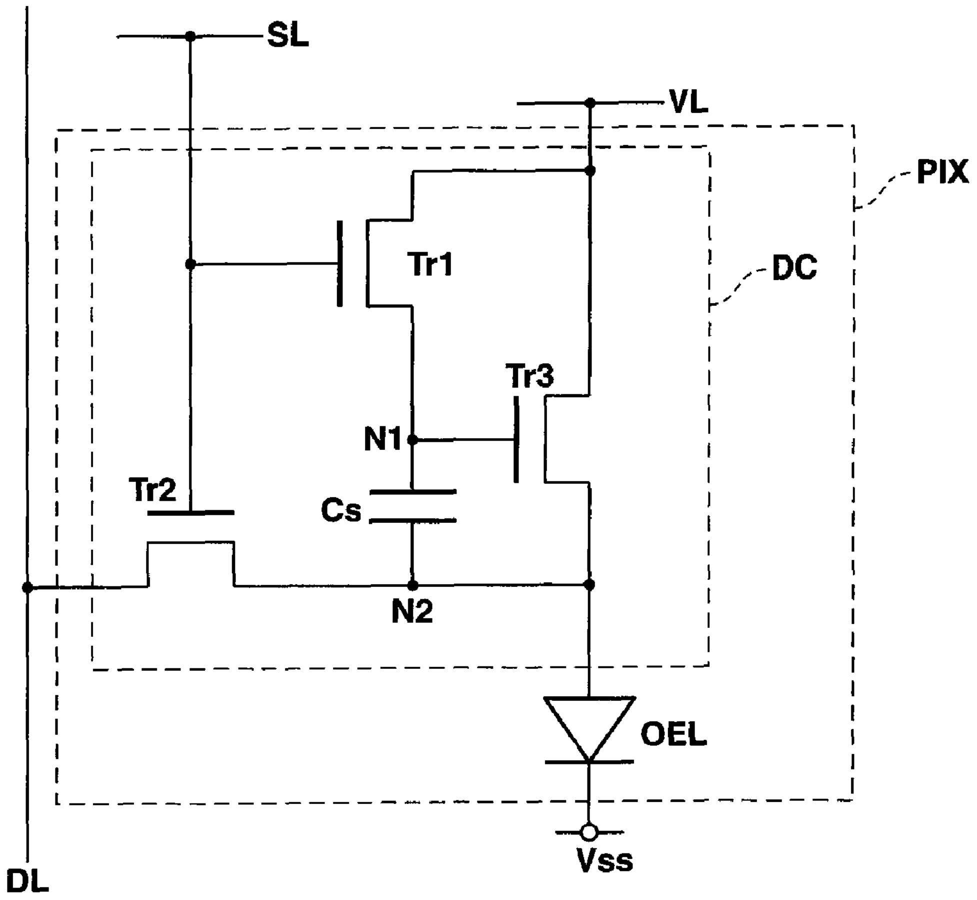
FIG. 4 is a circuit diagram showing a specific example of the configuration of a pixel driving circuit in a display panel of the device.

FIG. 4 is a circuit diagram showing a specific configuration of each pixel driving circuit DC in the display panel 110. Each pixel driving circuit DC is provided in the display panel 110 near each of the intersecting points between the plurality of scan lines SL and the plurality of data lines DL. The pixel driving circuit DC includes a first thin-film transistor Tr1, a second thin-film transistor Tr2, a third thin-film transistor Tr3, and a capacitor Cr.

The first thin-film transistor Tr1 has a gate terminal connected to the scan line SL. The first thin-film transistor Tr1 has a current path formed between a source terminal and a drain terminal and one end of which is connected to the power supply line VL. The other end of the current path formed between the source terminal and the drain terminal is connected to a contact N1.

The second thin-film transistor Tr2 has a gate terminal connected to the scan line SL. The second thin-film transistor Tr2 has a current path formed between a source terminal and a drain terminal and one end of which is connected to the data line DL. The other end of the current path formed between the source terminal and the drain terminal is connected to a contact N2.

The third thin-film transistor Tr3 has a gate terminal connected to the contact N1. The third thin-film transistor Tr3 has a current path formed between a source terminal and a drain terminal and one end of which is connected to the power supply line VL. The other end of the current path formed between the source terminal and the drain terminal is connected to the contact N2.

The capacitor Cs is connected to between the contacts N1 and N2. The capacitor Cs may be a parasitic capacitance produced between the gate and source of the thin-film transistor Tr3. The organic electroluminescent element OEL has an anode connected to the contact N2. The organic electroluminescent element OEL has a cathode set to a fixed potential Vss, for example, ground potential.

Now, the light emission driving control of the organic electroluminescent element OEL by the pixel driving circuit DC will be described.

Figure 5:
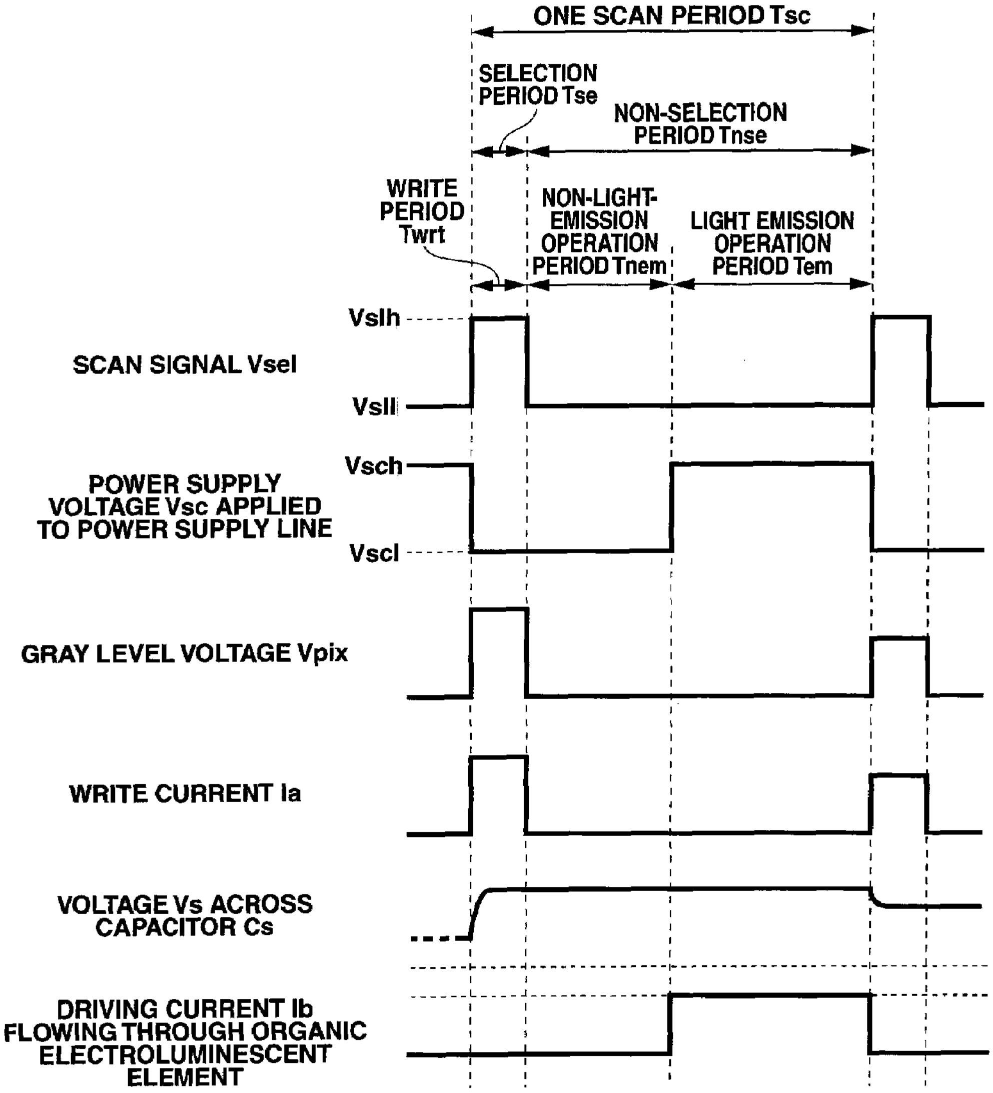
FIG. 5 is a timing chart showing operation timings for display pixels in the display panel of the device.
Figure 6A:
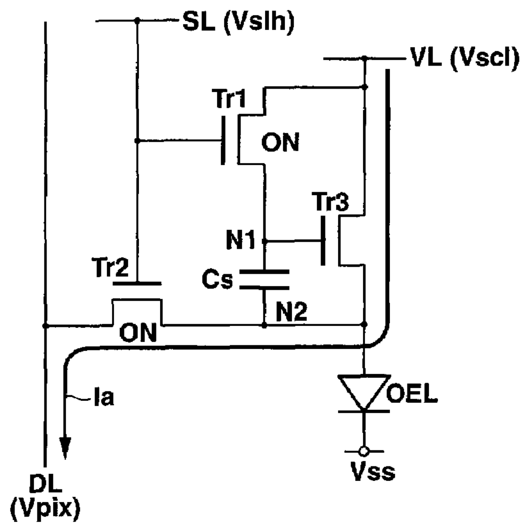
FIG. 6A is a diagram showing the operational state of a write operation, a non-light-emission operation, and a light emission operation for the display pixels.
Figure 6B:
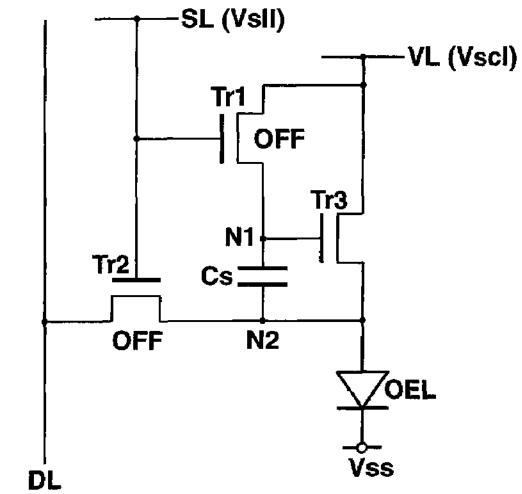
FIG. 6B is a diagram showing the operational state of the write operation, non-light-emission operation, and light emission operation for the display pixels.
Figure 6C:
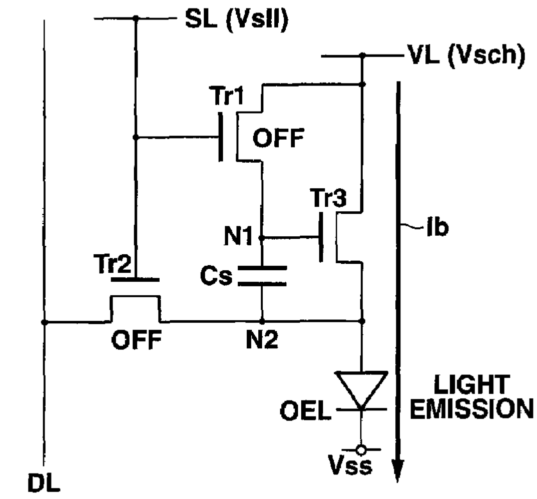
FIG. 6C is a diagram showing the operational state of the write operation, non-light-emission operation, and light emission operation for the display pixels.

FIG. 5 is a timing chart of operation timings for the display pixel PIX. FIGS. 6A to 6C show the operational state of a write operation on the display pixel PIX, a non-light-emission operation, and a light emission operation. In the light emission driving control of the organic electroluminescent element OEL, one scan period (one frame period) Tsc is set to be one cycle. The light emission driving control of the organic electroluminescent element OEL is performed by setting, within one scan period Tsc, a write operation period (or a selection period Tse for the display pixel PIX) Twrt, a light emission operation period Tem, and a non-light-emission operation period (a part of a non-selection period Tnse for the display pixel PIX) Tnem.

During the write operation period Twrt, the display pixels PIX connected to a particular scan line SL are selected (selection state). The write current Ia corresponding to display data is written to the display pixels PIX and held as a signal voltage. Concurrently, each of the organic electroluminescent elements OEL is set to the non-light-emission operation state.

During the light emission operation period Tem, the display pixels PIX are set to the non-selection state. Based on the signal voltage written to and held in the display pixels PIX during the write operation period Tse, the driving current Ib corresponding to display data is supplied to each of the organic electroluminescent elements OEL. The organic electroluminescent element OEL thus performs a light emission operation at a predetermined luminance gray level.

During the non-light-emission operation period Tnem (a part of the non-selection period Tnse for the display pixels PIX), the signal voltage written to the display pixels PIX during the write operation period Tse is held. However, no driving current based on the signal voltage is supplied to the organic electroluminescent elements OEL, which are thus in the non-light-emission operation state.

One scan period Tsc has the relationship shown in Expression (1). The write operation periods Twrt set for the respective rows are set so as to avoid mutual temporal overlapping.

$$Tsc=Twrt+Tnem+Tem \tag{1}$$

Now, the operations performed during the write operation period Twrt, the light emission operation period Tem, and the non-light-emission operation period Tnem will be described in detail.

(i) Write Operation Period Twrt

The write (programming) operation on the display pixels PIX during the write operation period Twrt will be described.

The write operation on the display pixels PIX is performed as follows. As shown in FIGS. 5 and 6A, first, the scan driver 120 applies the scan signal Vsel of the high level (Vslh) to a particular (ith) scan line SL to set the corresponding display pixels PIX to the selection state.

The power supply driver 140 applies the power supply voltage of the low level Vscl to a particular (ith) power supply line VL.

In synchronism with the timings when the scan signal Vsel of the high level (Vslh) is applied and when the power supply voltage of the low level Vscl is applied, the gray level voltage Vpix of a negative polarity is supplied to each of the data lines DL. The gray level voltage Vpix of the negative polarity corresponds to the display data for the (ith) row received by the data driver 130. The gray level voltage (Vpix) is set to be lower than the power supply voltage of the low level Vscl. For the gray level voltage (Vpix) shown in FIG. 5, an absolute value is shown.

Thus, each of the first thin-film transistor Tr1 and the second thin-film transistor Tr2 performs an on operation, the on operation of the thin-film transistors Tr1 and Tr2 allows the power supply voltage of the low level Vscl to be applied to the contact N1, that is, the gate terminal of the third thin-film transistor Tr3, and to one end of the capacitor Cs. The gray level voltage Vpix is applied to the contact N2 via the data line DL. The application of the voltages Vscl and Vpix causes a potential difference between the contacts N1 and N2 (between the gate and source of the thin-film transistor Tr3).

The potential difference between the contacts N1 and N2 allows the third thin-film transistor Tr3 to perform an on operation. The on operation of the third thin-film transistor Tr3 allows the write current Ia to flow from the power supply line VL through the third thin-film transistor Tr3, the contact N2, the thin-film transistor Tr2, and the data line DL to the data driver 130 as shown in FIG. 6A. The magnitude of the write current Ia corresponds to the gray level voltage Vpix.

At this time, charges corresponding to the potential difference Vs between the contacts N1 and N2 (between the gate and source of the thin-film transistor Tr3) are stored in the capacitor Cs and held as a voltage component. This sets the potential difference (charging voltage) across the capacitor Cs to Vs.

The power supply voltage Vscl having a voltage level equal to or lower than ground potential is applied to the power supply line VL. The write current Ia is controlled to flow in the data line direction of the data line DL. This control reduces the potential applied to the anode (contact N2) of the organic electroluminescent element OEL, below the potential (ground potential) of the cathode. Thus, a reverse bias voltage is applied to the organic electroluminescent element OEL, thus preventing the driving current from flowing through the organic electroluminescent element OEL. As a result, the organic electroluminescent element is set to the non-light-emission operation state in which no light emission operation is performed.

(ii) Non-light-emission Operation Period Tnem

The non-light-emission operation of the organic electroluminescent element during the non-light-emission operation period Tnem after the write operation period Twrt will be described.

The non-light-emission operation of the organic electroluminescent element DEL is performed as follows. As shown in FIGS. 5 and 6B, the scan driver 120 applies the scan signal Vsel of the low level (Vsll) to the particular (ith) power supply line VL. Thus, the display pixels PIX are set to the non-selection state.

Concurrently, the power supply driver 140 applies the power supply voltage of the low level Vscl to the particular (ith) power supply line VL.

During the non-light-emission operation period Tnem, the operation performed by the data driver 130 to apply the gray level voltage is stopped.

Thus, each of the first thin-film transistor Tr1 and the second thin-film transistor Tr2 performs an off operation. The off operation of the thin-film transistors Tr1 and Tr2 prevents the power supply voltage Vsc from being applied to the contact N1, and disconnects the contact N2 and the data line DL from each other. Thus, the capacitor Cs holds charges accumulated during the write operation, maintaining the potential difference Vs between the contacts N1 and N2 (between the gate and source of the thin-film transistor Tr3).

At this time, since the power supply voltage of the low level Vscl has been applied to the power supply line VL, the potential applied to the anode (contact N2) of the organic electroluminescent element OEL is lower than that (ground potential) of the cathode. Thus, the reverse bias voltage is applied to the organic electroluminescent element OEL, with no driving current flowing through the organic electroluminescent element OEL. As a result, the organic electroluminescent element OEL is prevented from performing a light emission operation, and is thus set to the non-light-emission operation state.

(iii) Light Emission Operation Period Tem

The non-light-emission operation of the organic electroluminescent element during the light emission operation period Tem after the write operation period Twrt will be described.

The light emission operation of the organic electroluminescent element OEL is performed as follows. As shown in FIGS. 5 and 6C, the scan driver 120 applies the scan signal Vsel of the low level (Vsll) to the particular (ith) power supply line VL. Thus, the display pixels PIX are set to the non-selection state.

Concurrently, the power supply driver 140 applies the power supply voltage of the high level Vsch to the particular (ith) power supply line VL.

During the light emission operation period Tem, the operation performed by the data driver 130 to apply the gray level voltage Vpix is stopped.

Thus, each of the first thin-film transistor Tr1 and the second thin-film transistor Tr2 performs an off operation. The off operation of the thin-film transistors Tr1 and TR2 prevents the power supply voltage Vsc from being applied to the contact N1, and disconnects the contact N2 and the data line DL from each other. Thus, the capacitor Cs holds charges accumulated during the above-described write operation.

The capacitor Cs holds the charges accumulated during the write operation. Thus, the potential difference Vs between the contacts N1 and N2, that is, between the gate and source of the thin-film transistor Tr3, is maintained. This allows the third thin-film transistor Tr3 to maintain an on state.

Since the power supply voltage Vsch having a higher voltage level than ground potential is applied to the power supply line VL, the potential applied to the anode (contact N2) of the organic electroluminescent element GEL is higher than that (ground potential) of the cathode.

Thus, as shown in FIG. 6B, the predetermined driving current Ib flows from the power supply line VL through the third thin-film transistor Tr3 and the contact N2 in the forward bias direction of the organic electroluminescent element OEL. As a result, the organic electroluminescent element OEL emits light (light emission operation state).

The charges held by the capacitor Cs causes a potential difference (charging voltage) Vs across the capacitor Cs. The potential difference Vs corresponds to the potential difference obtained when the write current Ia corresponding to the gray level voltage Vpix flows through the third thin-film transistor Tr3. Thus, the driving current Ib flowing through the organic electroluminescent element OEL has a current value equivalent to that of the write current Ia.

During the light emission operation period Tem following the write period Twrt, the driving current is continuously supplied to the organic electroluminescent element OEL through the third thin-film transistor Tr3. The magnitude of the driving current flowing through the organic electroluminescent element OEL corresponds to the display data (gray level current Ipix) written during the write period Twrt. Thus, the organic electroluminescent element OEL continues the light emission operation of emitting light at a luminance gray level corresponding to the display data.

During one scan period (one frame period) Tsc, the system controller 150 sequentially repeats a series of operations for the write operation period Twrt, light emission operation period Tem, and non-light-emission operation period Tnem shown in FIGS. 5 and 6A to 6C, on the display pixels PIX in all the rows (scan lines SL) included in the display panel 110. Thus, the display data (gray level current Ipix) for one screen of the display panel 110 is written to each of the organic electroluminescent elements OEL in the display panel 110. Each of the display pixels PIX in the display panel 110 emits light at a predetermined luminance gray level to display the desired image information on the display panel 110. Concurrently, the system controller 150 appropriately controls the number of rows in which the organic electroluminescent elements OEL are set to the light emission operation state and the number of rows in which the organic electroluminescent elements OEL are set to the non-light-emission operation state.

In response to the write operation on the display pixels PIX, the system controller 150 sequentially shifts the rows in which the organic electroluminescent elements OEL are set to the light emission operation state and the rows in which the organic electroluminescent elements OEL are set to the non-light-emission operation state, within the display area of the display panel 110. Thus, the instantaneous light emission luminance of the organic electroluminescent elements of the display pixels PIX set to the light emission operation state remains unchanged. In contrast, the average luminance of the organic electroluminescent elements of the display pixels PIX during one frame period varies depending on the ratio of the number of rows for the light emission operation state to the number of rows for the non-light-emission operation state.

That is, the average luminance of the display pixels PIX decreases with increasing number of rows in which the organic electroluminescent elements OEL are set to the non-light-emission operation state. The luminance of the display panel 110 viewed by the human eyes corresponds to the average luminance of the display pixels PIX. Thus, the luminance of display panel 110 based on the average luminance of the display pixels PIX can be controlled by controllably varying the ratio, in the display panel 110, of the number of rows in which the organic electroluminescent elements OEL are set to the light emission operation state to the number of rows in which the organic electroluminescent elements OEL are set to the non-light-emission operation state. Here, the luminance of display panel 110 based on the average luminance of the display pixels PIX is hereinafter referred to as display luminance for convenience.

The power supply driver 140 controls voltages applied to the plurality of power supply lines VL in the display panel 110, that is, the anode potentials (contacts N2) of the plurality of organic electroluminescent elements OEL. The power supply driver 140 applies the power supply voltage Vscl to one power supply line VL corresponding to the row (line) in which the write operation shown in FIG. 6A is performed on the plurality of organic electroluminescent elements OEL.

The power supply driver 140 also applies the power supply voltage Vscl to the power supply line VL corresponding to the row in which the organic electroluminescent elements OEL are set to the non-light-emission operation state shown in FIG. 6B. The power supply driver 140 thus sets the organic electroluminescent elements OEL corresponding to the row to be set to the non-light-emission operation state, to the non-light-emission operation state.

The power supply driver 140 applies the power supply voltage of the high level Vsch to the power supply lines VL corresponding to the rows other than the above-described one. The power supply driver 140 thus sets the organic electroluminescent elements OEL in the rows to which the power supply voltage Vsch is applied, to the light emission operation state.

The power supply driver 140 sequentially shifts the rows on which the write operation is performed and the rows to be set to the non-light-emission operation state, as time elapses. Concurrently, the power supply driver 140 appropriately controls the ratio of the rows to be set to the non-light-emission operation state to the rows to be set to the light emission operation state. Thus, the power supply driver 140 controls the display luminance of the display panel 110.

Now, the specific driving control operation of the display panel driving device 100 will be described.

Figure 7:
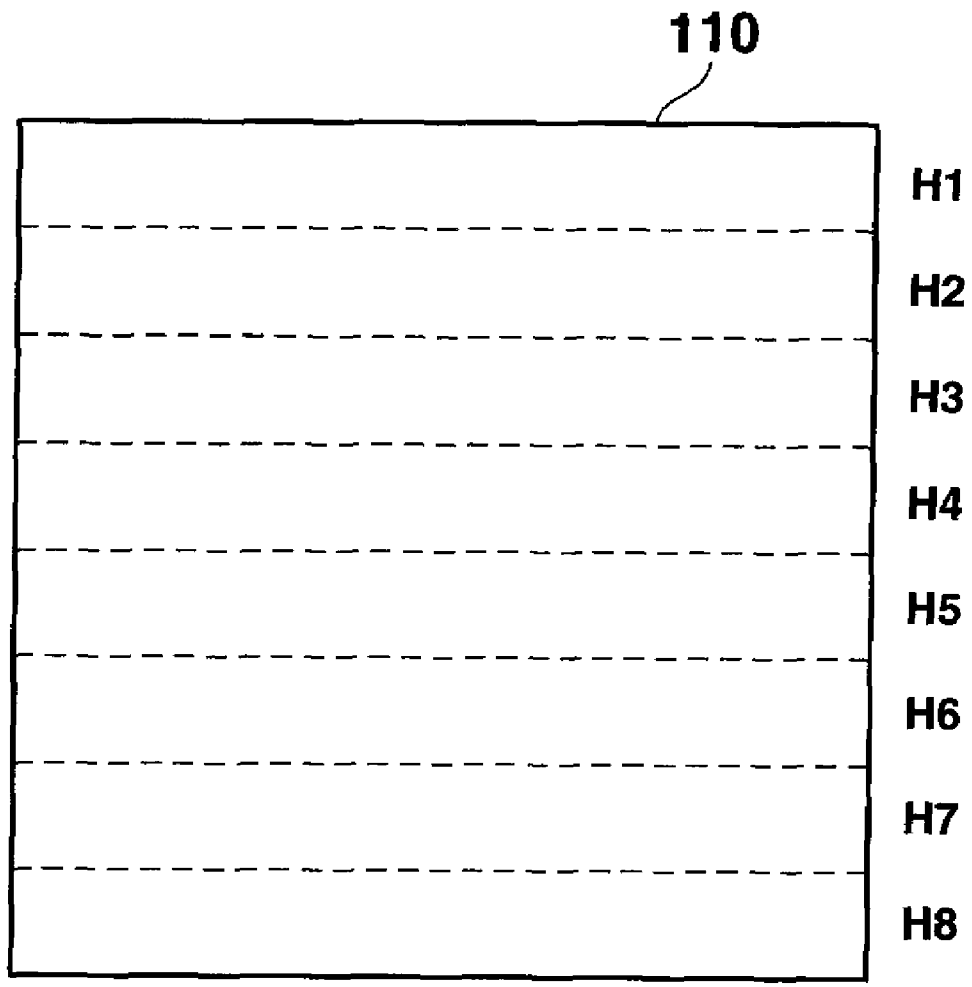
FIG. 7 is a diagram showing that the display area of the display panel of the device is partitioned into eight partitioned display areas.

FIG. 7 shows that the display area of the display panel 110 is partitioned into eight partitioned display areas. The display area of the display panel 110 is partitioned into, for example, eight partitioned display areas H1 to H8. Each of the eight partitioned display areas H1 to H8 has one or more rows in the display panel 110.

The power supply driver 140 sets the organic electroluminescent element OEL of each of the display pixels PIX in each of the eight partitioned display areas H1 to H8, to the non-light-emission operation state (non-display operation state) or the light emission operation state (display operation state). Thus, the power supply driver 140 applies the power supply voltage of the low level Vscl or the power supply voltage of the high level Vsch to one or more power supply lines VL corresponding to each of the partitioned display areas H1 to H8.

Figure 8:
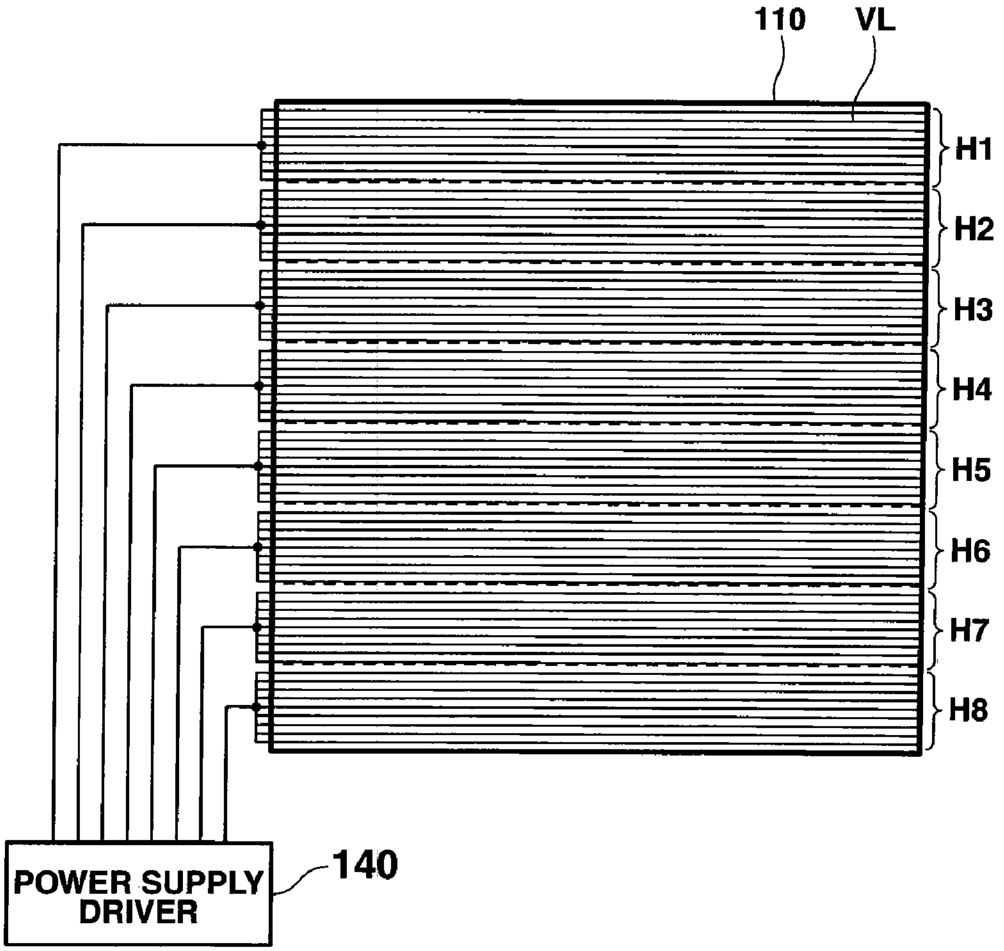
FIG. 8 is a diagram showing an example of the connection configuration of a power supply driver and power supply lines in the display panel established when the display area of the display panel of the device is partitioned into eight partitioned display areas.
Figure 9:
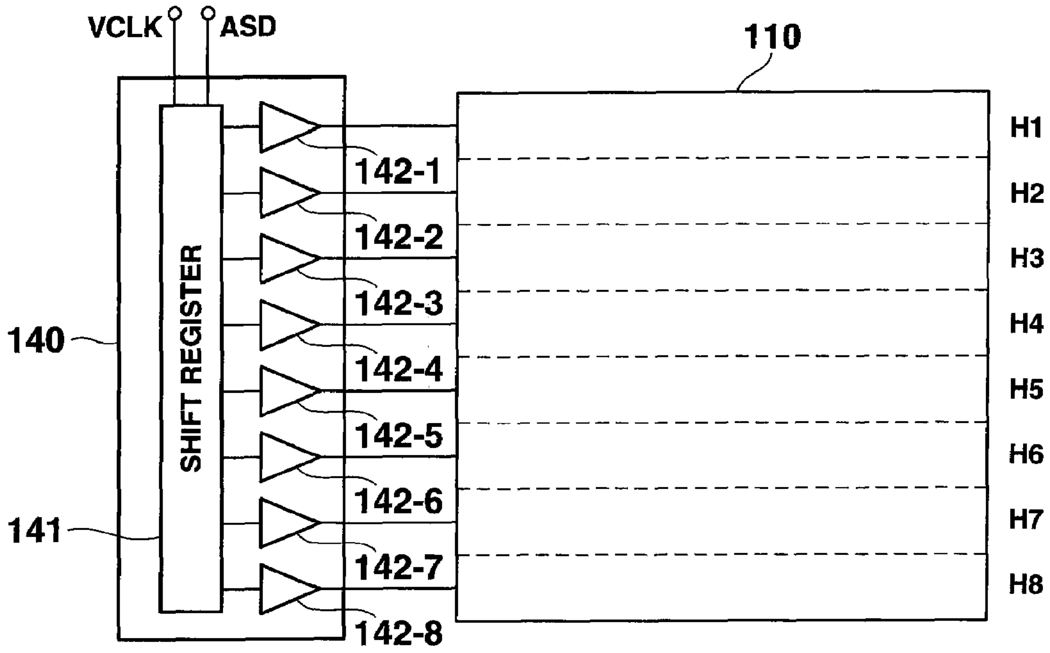
FIG. 9 is a diagram showing the general configuration of an example of the power supply driver.

FIG. 8 is a diagram of the configuration of an example of connections between the power supply driver 140 and the plurality of power supply lines VL in the display panel 110 established when the display area of the display panel 110 is partitioned into the partitioned display areas H1 to H8. FIG. 9 is a schematic diagram of the configuration of an example of the power supply driver 140 in FIG. 8. The scan driver 120 is omitted from FIGS. 8 and 9 for convenience.

As shown in FIG. 8, the number of outputs (for example, eight) from the power supply driver 140 corresponds to the number of the partitioned display areas H1 to H8. Each of the outputs of the power supply driver 140 is connected to all the power supply lines in the corresponding one of the partitioned display areas H1 to H8 of the display panel 110.

As shown in FIG. 9, the power supply driver 140 is composed of a shift register 141 with stages the number which (for example, eight) corresponds to the number of the partitioned display areas H1 to H8, and a plurality of buffers 142-1 to 142-8. The power supply driver 140 applies the power supply voltage Vsc having a predetermined voltage level to each of the power supply lines VL based on the power supply control signal supplied by the system controller 150, for example, the anode control data ASD or the power supply clock signal VCLK. Specifically, the shift register 141 sequentially shifts from the top to bottom of the display panel 110, for example, from the partitioned display area H1 to the partitioned display area H8, while outputting the anode control data ASD. Each of the plurality of buffers 142-1 to 142-8 applies the corresponding shift output from the shift register 141 to each of the power supply lines VL as the power supply voltage Vsc.

The anode control data ASD is composed of, for example, serial. 8-bit data. Each bit of the 8-bit data corresponds to the output of each of the buffers 142-1 to 142-8. When the anode control data ASD has a bit value of “1”, the power supply voltage Vsc output to the power supply line VL by the buffer in the power supply driver 140 is at the high level Vsch. Thus, each of the organic electroluminescent elements OEL is set to the light emission operation state shown in FIG. 6C, by the pixel driving circuit DC connected to the corresponding power supply line VL.

On the other hand, when the anode control data ASD has a bit value of “0”, the power supply voltage Vsc output to the power supply line VL by the buffer in the power supply driver 140 is at the low level Vscl. Thus, each of the organic electroluminescent elements OEL is set to the write operation state (non-light-emission operation state) shown in FIG. 6A or the non-light-emission operation state shown in FIG. 6B, by the pixel driving circuit DC connected to the corresponding power supply line VL.

Thus, with the power supply driver 140, when the anode control data ASD is, for example, 00000001, the organic electroluminescent elements OEL in seven H1 to H7 of the eight partitioned display areas H1 to H8 of the display panel 110 are set to the non-light-emission operation state, with only the organic electroluminescent elements OEL in one partitioned display area H8 set to light emission operation state. That is, the display panel 110 emits light at a 1/8 duty ratio.

On the other hand, when the anode control data ASD is, for example, 01111111, the organic electroluminescent elements OEL in only one H1 of the eight partitioned display areas H1 to H8 of the display panel 110 are set to the non-light-emission operation state, with the organic electroluminescent elements OEL in the seven partitioned display areas H2 to H8 in light emission operation state. That is, the display panel 110 emits light at a 7/8 duty ratio.

Thus, the system controller 150 sets the bit values of the anode control data ASD to one of 01111111, 00111111, 0001111, . . . , 00000001 to control the display luminance of the display panel 110 to between a 7/8 and 1/8 duty ratio.

Now, the driving control operation of the device configured as described above will be described.

Figure 10:
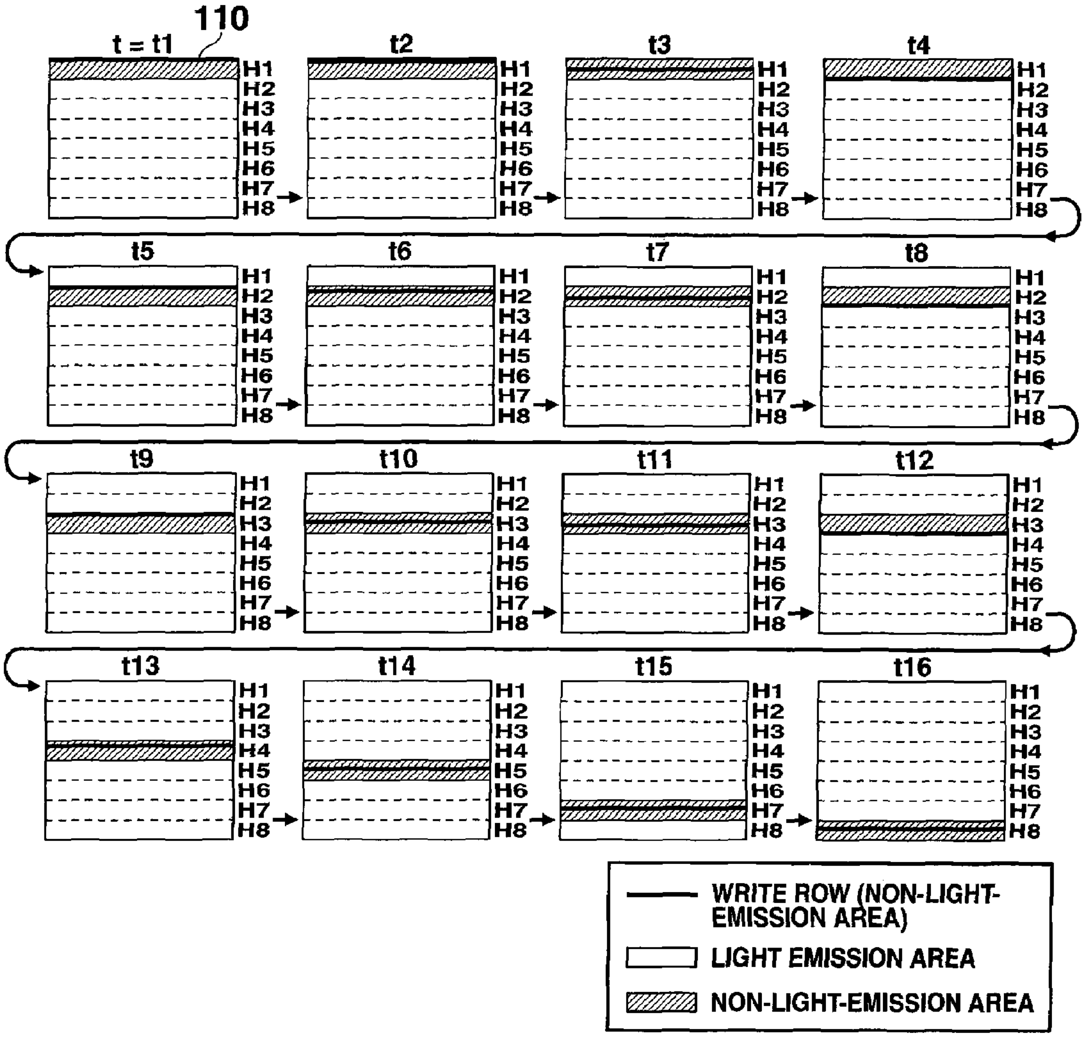
FIG. 10 is a diagram showing an example of the transition of a display state observed when the light emission of the display panel of the device is controlled at a 7/8 duty ratio.

FIG. 10 shows an example of the transition of the display state observed when the display panel 110 is controlled to emit light, for example, at a 7/8 duty ratio.

First, at time t1, the bit values of the anode control data ASD are set to 01111111. Thus, the organic electroluminescent elements OEL in one (first display area) H1 of the eight partitioned display areas H1 to H8 are set to the non-light-emission operation state shown in FIG. 6B. Concurrently, the organic electroluminescent elements OEL in the first row in one partitioned display area H1 are set to the write operation state shown in FIG. 6A. The organic electroluminescent elements OEL in the seven other partitioned display areas (second display areas) H2 to H8 are set to the light emission operation state shown in FIG. 6C.

Subsequently, between time t2 and time t4, the organic electroluminescent elements GEL in one partitioned display area H1 are sequentially set to the write operation state. The organic electroluminescent elements OEL in the seven other partitioned display areas H2 to H8 are kept in the light emission operation state.

Then, at time t5 following the completion of the write operation on the organic electroluminescent elements in all the rows in one partitioned display area H1, the bit values of the anode control data ASD are set to 10111111. Thus, the organic electroluminescent elements OEL in one partitioned display area H2 are set to the non-light-emission operation state. Concurrently, the organic electroluminescent elements OEL in the first row in one partitioned display area H2 are set to the write operation state. The organic electroluminescent elements GEL in the seven other partitioned display areas H1 and H3 to H8 are set to the light emission operation state.

Subsequently, between time t6 and time t8, the organic electroluminescent elements OEL in one partitioned display area H2 are sequentially set to the write operation state. The organic electroluminescent elements OEL in the seven other partitioned display areas H1 and H3 to H8 are kept in the light emission operation state.

Then, at time t8 following the completion of the write operation on the organic electroluminescent elements in all the rows in one partitioned display area H2, the bit values of the anode control data ASD are set to 11011111. Thus, the organic electroluminescent elements OEL in one partitioned display area H3 are set to the non-light-emission operation state. Concurrently, the organic electroluminescent elements OEL in the first row in one partitioned display area H3 are set to the write operation state. The organic electroluminescent elements OEL in the seven other partitioned display areas H1, H2, and H4 to H8 are set to the light emission operation state.

Subsequently, between time t10 and time t12, the organic electroluminescent elements OEL in one partitioned display area H3 are sequentially set to the write operation state. The organic electroluminescent elements OEL in the seven other partitioned display areas H1, H2, and H4 to H8 are kept in the light emission operation state.

Similarly, appropriately changing the bit values of the anode control data ASD allows the organic electroluminescent elements OEL in one of the partitioned display areas H4 to H8 to be sequentially set to the non-light-emission operation state. Concurrently, the organic electroluminescent elements OEL in the seven other partitioned display areas are set to the light emission operation state. The write operation state is repeatedly performed on the organic electroluminescent elements DEL in the partitioned display area set to the non-light-emission operation state.

Figure 11:
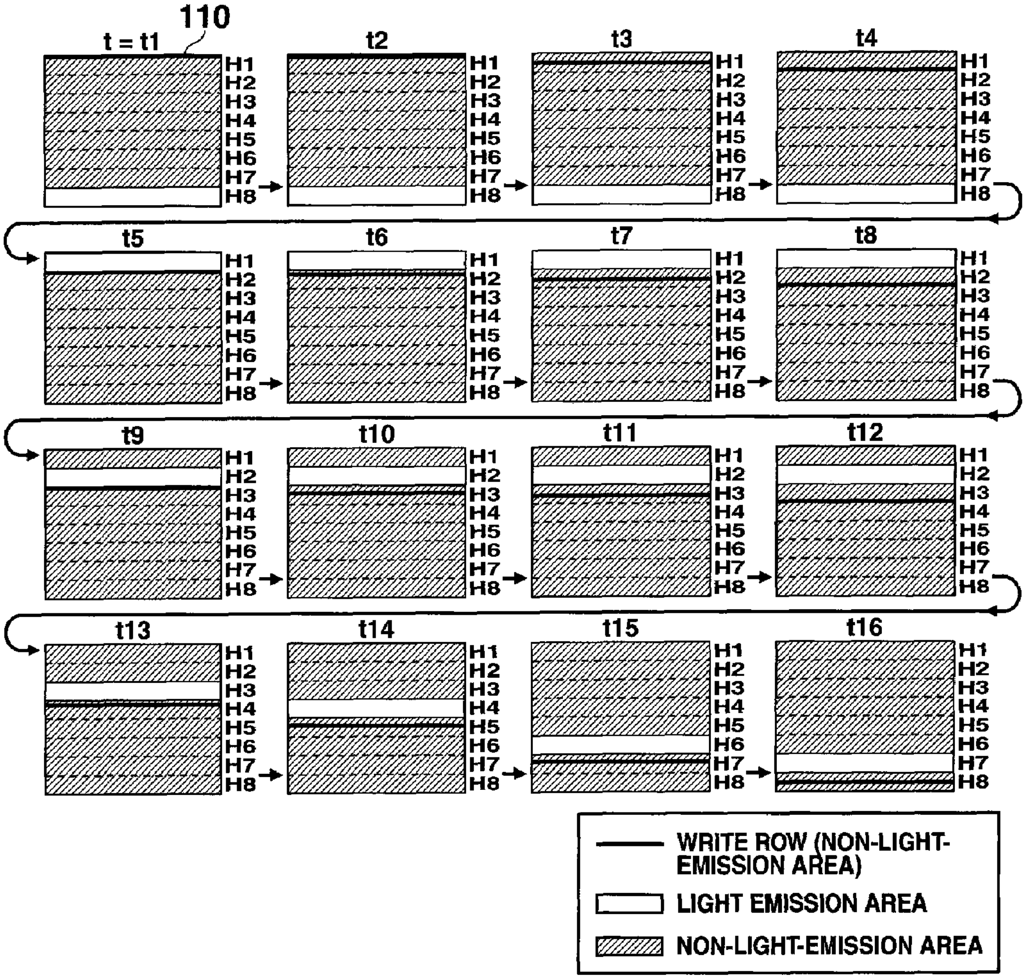
FIG. 11 is a diagram showing an example of the transition of the display state observed when the light emission of the display panel of the device is controlled at a 1/8 duty ratio.

Now, FIG. 11 shows an example of the transition of the display state observed when the display panel 110 is controlled to emit light, for example, at a 1/8 duty ratio.

First, at time t1, the bit values of the anode control data ASD are set to 00000001. Thus, the organic electroluminescent elements OEL in one H1 of the eight partitioned display areas H1 to H8 are set to the non-light-emission operation state. Concurrently, the organic electroluminescent elements OEL in the first row in one partitioned display area H1 are set to the write operation state.

Six H2 to H7 of the organic electroluminescent elements OEL in the seven other partitioned display areas (second display areas) H2 to H8 are set to the non-light-emission operation state. The organic electroluminescent elements OEL in the remaining one partitioned display area H8 are set to the light emission operation state.

Then, between time t2 and time t4, the organic electroluminescent elements GEL in one partitioned display area H1 are sequentially set to the write operation state. The organic electroluminescent elements OEL in six other partitioned display areas H2 to H7 are kept in the non-light-emission operation state. The organic electroluminescent elements OEL in one partitioned display area H8 are kept in the light emission operation state.

Then, at time t5 following the completion of the write operation on the organic electroluminescent elements in all the rows in one partitioned display area H1, the bit values of the anode control data ASD are set to 10000000. Thus, the organic electroluminescent elements OEL in the partitioned display areas H2 to H8 are set to the non-light-emission operation state. Concurrently, the organic electroluminescent elements OEL in the first row in one partitioned display area H2 are set to the write operation state. The organic electroluminescent elements OEL in one partitioned display area H1 are set to the light emission operation state.

Then, between time t6 and time t8, the organic electroluminescent elements OEL in one partitioned display area H2 are sequentially set to the write operation state. The organic electroluminescent elements OEL in six other partitioned display areas H3 to H8 are kept in the non-light-emission operation state. The organic electroluminescent elements OEL in one partitioned display area H1 are kept in the light emission operation state.

Then, at time t8 following the completion of the write operation on the organic electroluminescent elements in all the rows in the partitioned display area H2, the bit values of the anode control data ASD are set to 01000000. Thus, the organic electroluminescent elements GEL in the partitioned display areas H1 and H3 to H8 are set to the non-light-emission operation state. Concurrently, the organic electroluminescent elements OEL in the first row in one partitioned display area H3 are set to the write operation state. The organic electroluminescent elements OEL in one partitioned display area H2 are set to the light emission operation state.

Then, between time t10 and time t12, the organic electroluminescent elements OEL in one partitioned display area H3 are sequentially set to the write operation state. The organic electroluminescent elements OEL in the six other partitioned display areas H3 to H8 are kept in the non-light-emission operation state. The organic electroluminescent elements OEL in one partitioned display area H2 are kept in the light emission operation state.

Similarly, appropriately changing the bit values of the anode control data ASD allows the organic electroluminescent elements OEL in one of the partitioned display areas H3 to H7 to be sequentially set to the light emission operation state. Concurrently, the organic electroluminescent elements GEL in the seven other partitioned display areas are set to the non-light-emission operation state. The write operation state is repeatedly performed on the organic electroluminescent elements OEL in the rows in the partitioned display areas set to the non-light-emission operation state.

Thus, the above-described first embodiment divides the plurality of organic electroluminescent elements OEL in the display panel 110, into the plurality of partitioned display areas, and controls the ratio(area-ratio) of the area(first area) of those of the partitioned display areas in which the organic electroluminescent elements are set to the light emission operation state to the area(second area) of those of the partitioned display areas in which the organic electroluminescent elements are set to the light emission operation state. Consequently, the display luminance of the display panel 110 can be variably controlled. The display data written to the display pixels PIX is the same as that in the conventional art. Thus, the number of gray levels in image information corresponding to the display data displayed on the display panel 110 is also the same as that in the conventional art.

Specifically, the display panel 110 is partitioned into, for example, the eight partitioned display areas H1 to H8. The ratio of the number of partitioned display areas set to the light emission operation state to the total number of the partitioned display areas H1 to H8 is variably controlled to between, for example, a 7/8 and a 1/8 duty ratio. Thus, the display luminance can be varied among seven levels without the need to change the display data.

In the present embodiment, for example, the light receiving sensor 200 is connected to the system controller 150 to detect the brightness of the surrounding environment. The system controller 150 variably controls the display luminance of the display panel 110 to between, for example, a 7/8 and a 1/8 duty ratio according to the brightness of the surrounding environment detected by the light receiving sensor 200. The display panel 110 can thus be adjusted to the appropriate luminance according to the brightness of the surrounding environment. Instead of automatically adjusting the duty ratio according to the brightness of the surrounding environment, the device may allow the user to appropriately switch the set duty ratio.

The display luminance of the display panel 110 is proportional to the duty ratio. Description will be given of the case where the ratio of the area of partitioned display areas in which the organic electroluminescent elements OEL perform the light emission operation to the entire display area is controlled to 7/8 (7/8 duty ratio) as shown in FIG. 10. In this case, a current flowing through the pixels during the light emission operation of the organic electroluminescent elements OEL is defined as I. The efficiency of the pixels is defined as $\alpha$ (cd/A), and the area of the pixel is defined as S (m2). Then, the luminance obtained at a moment of light emission is expressed as:

$$(I \cdot \alpha \cdot S)$$

Since the ratio for the partitioned display areas in which the organic electroluminescentelements OEL perform the light emission operation is controlled to 7/8 (7/8 duty ratio), the average luminance of the organic electroluminescentelement OEL of one display pixel PIX in the display panel 110 is expressed as:

$$(I \cdot \alpha \cdot S) \cdot (7/8)$$

If the ratio of the area of the partitioned display areas in which the organic electroluminescent elements OEL perform the light emission operation is controlled to 1/8 (1/8 duty ratio) as shown in FIG. 11, the average luminance of the organic electroluminescent element OEL of one display pixel PIX in the display panel 110 is expressed as:

$$(I \cdot \alpha \cdot S) \cdot (1/8)$$

In this manner, the present embodiment varies the ratio of the organic electroluminescent elements OEL allowed to perform the light emission operation to the plurality of organic electroluminescent elements OEL in the display panel 110. Variably controlling the ratio to between, for example, a 7/8 and a 1/8 duty ratio enables the display luminance of the display panel to be varied sevenfold. The display data (gray level voltage Vpix) supplied to the display pixels PIX as well as the write operation are exactly the same as those in the conventional art. Thus, the number of gray levels corresponding to the display data for the image information displayed on the display panel 110 is prevented from depending on the above-described duty ratio. Consequently, the display luminance can be set according to the environment or the like, with the number of gray levels in the image information displayed on the display panel 110 maintained.

For example, the present embodiment allows the maximum value of the display luminance to be set to 350 nit in a bright room and to 50 nit in a pitch-dark room.

<Second Embodiment>

Now, a second embodiment of the present invention will be described. The configuration of the display panel driving device is the same as that shown in FIGS. 1 to 4 and will thus not be described below.

In the first embodiment, while a write operation is being performed on the organic electroluminescent elements GEL in each of the rows in one partitioned display area set to the non-light-emission operation state, the light emission operation state is set for the partitioned display areas set to the light emission operation state throughout the period in which the write operation is performed on the organic electroluminescent elements GEL in all the rows in the one partitioned display area set to the non-light-emission operation state.

In contrast, the second embodiment offers, in addition to the characteristics of the first embodiment, the following characteristic. The period during which a write operation is performed on the organic electroluminescent elements OEL in each of the rows in one partitioned display area includes a period during which a particular partitioned display area is set to the light emission operation state and a period during which the particular partitioned display area is set to the non-light-emission operation state. Thus, in the period during which the write operation is performed on each of the rows in one partitioned display area, the ratio (time ratio) of the time for which the partitioned display area is set to the light emission operation and the time for which the partitioned display area is set to the non-light-emission operation state is variably controlled.

Figure 12:
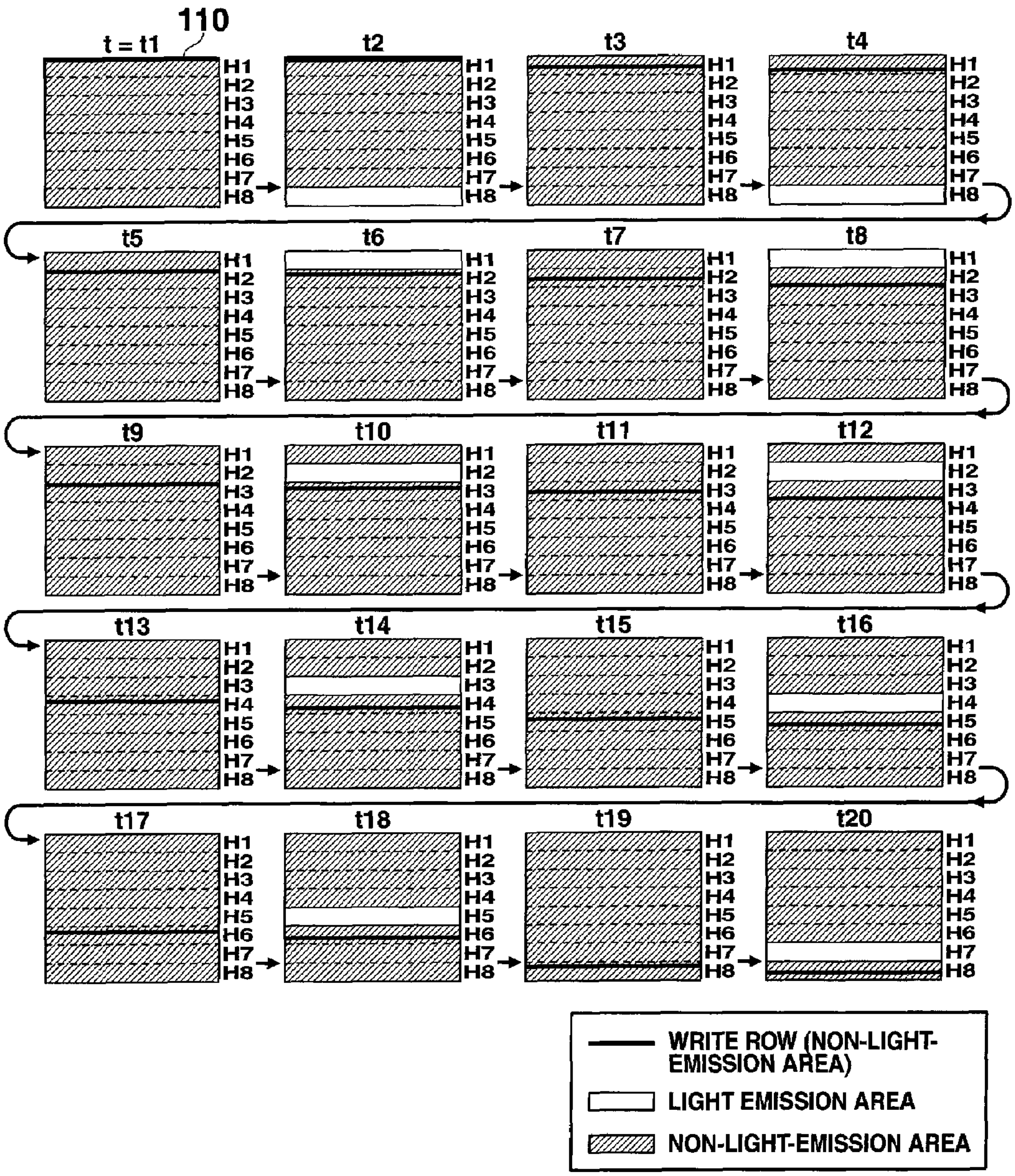
FIG. 12 is a diagram showing an example of the transition of the display state observed when the ratio of a time for which a particular partitioned display area is set to a light-emission driving state to a time for which a particular partitioned display area is set to a non-light-emission driving state is 1:1.

FIG. 12 shows an example of the transition of the display state observed when the ratio of the time for which a particular partitioned display area is set to the light emission operation state to the time for which the particular partitioned display area is set the non-light-emission operation state is 1:1.

For example, a period t1 is defined as the elapse of a quarter of the write period from the time when the organic electroluminescent elements OEL in the first row in the partitioned display area (first display area) H1 are set to the write operation state to the time when write operation is completed on the organic electroluminescent elements OEL in the final row in the partitioned display area H1. The period from the time corresponding to the half of the write period to the time corresponding to the three-fourths of the write period is defined as t3.

During the period t1 and a period t3, the bit values of the anode control data ASD are set to, for example, 00000000. Thus, one partitioned display area H1 and the seven other partitioned display areas (second display areas) H2 to H8 are set to the non-light-emission operation state.

Then, during a period (t2) from the time corresponding to the quarter of the write period to the time corresponding to the half of the write period and a period (t4) from the time corresponding to the three-fourths of the write period to the end of the write period, the bit values of the anode control data ASD are set to 00000001. Thus, one partitioned display area (particular partitioned display area) H8 is set to the light emission operation state. Consequently, the partitioned display area H8, included in the second display areas, is set to the light emission operation state only during the half of the write period and to the non-light-emission operation state only during the remaining half of the write period.

A period t5 is defined as the elapse of a quarter of the write period from the time when the organic electroluminescent elements OEL in the first row in one partitioned display area H2 are set to the write operation state to the time when write operation is completed on the organic electroluminescent elements OEL in the final row in the partitioned display area H2. The period from the time corresponding to the half of the write period to the time corresponding to the three-fourths of the write period is defined as t7.

During the periods t5 and t7, the bit values of the anode control data ASD are set to, for example, 00000000. Thus, all of the eight partitioned display areas H1 to H8 are set to the non-light-emission operation state.

Then, during a period (t6) from the time corresponding to the quarter of the write period to the time corresponding to the half of the write period and a period (t8) from the time corresponding to the three-fourths of the write period to the end of the write period, the bit values of the anode control data ASD are set to 10000000. Thus, one partitioned display area (particular partitioned display area) H1 is set to the light emission operation state. Consequently, the partitioned display area H1 is set to the light emission operation state only during the half of the write period and to the non-light-emission operation state only during the remaining half of the write period.

Thus, the partitioned display area H2 is set to the light emission operation state only during the half of the write period during which the write operation is performed on the organic electroluminescent elements OEL in all the rows in the partitioned display area H3 and to the non-light-emission operation state only during the remaining half of the write period.

The partitioned display area H3 is set to the light emission operation state only during the half of the write period during which the write operation is performed on the organic electroluminescent elements OEL in all the rows in the partitioned display area H4 and to the non-light-emission operation state only during the remaining half of the write period.

Similarly, an operation is repeated which appropriately changes the set bit values of the anode control data ASD to switchably set each partitioned display area H to the light emission operation state or the non-light-emission operation state.

As described above, the second embodiment not only offers the characteristics of the above-described first embodiment but also controls the ratio of the time for which each of the organic electroluminescent elements OEL is set to the light emission operation state to the write period during which the write operation is performed on each of rows in one partitioned display area. Thus, the present embodiment can exert effects similar to those of the first embodiment.

Moreover, according to the present embodiment, even when the ratio of the area of the partitioned display area in which the organic electroluminescent elements OEL perform the light emission operation to the area of the entire display area is set to a 1/8 duty ratio as shown in FIG. 11 described above, the ratio of the light emission operation time to non-light-emission operation time of a particular partitioned display area is set to, for example, 1:1 to control the ratio (time duty ratio) of the light emission operation time to the write period for the partitioned display area, to 1/2. Thus, compared to the transition of the display state shown in FIG. 11 described above, the transition according to the present embodiment enables the display luminance of the display panel 110 to be reduced to half.

In the description of the present embodiment, the remaining partitioned display areas (third partitioned display area) corresponding to the second display areas except the particular partitioned display area are set to the non-light-emission operation state as shown in FIG. 12 described above. However, the present embodiment is not limited to this aspect. The above-described first embodiment may be applied to the plurality of partitioned display areas included in the third display areas. That is, the write period for the first display area may include partitioned display areas set to the light emission operation state and partitioned display areas set to the non-light-emission operation state. The ratio of the number of partitioned display areas set to the light emission operation state and the number of partitioned display areas set to the non-light-emission operation state may be appropriately controllably changed.

In the present embodiment, the predetermined partitioned display area is switched between the light emission operation state and the non-light-emission operation state every quarter of the write period during which the write operation is performed on one partitioned display area. However, the present embodiment is not limited to this aspect. The predetermined partitioned display area may be switched between the light emission operation state and the non-light-emission operation state at other timings.

In the above-described second embodiment, the time duty ratio is 1/2. The time duty ratio is not limited to 1/2 but may be variably controlled to, for example, 1/3 or 1/4. Thus, the display luminance of the display panel 110 can be set to be, for example, one-third or one-fourth of that in the display state shown in FIG. 11 described above.

<Third Embodiment>

Now, a third embodiment of the present invention will be described. The configuration of the display panel driving device is the same as that in FIGS. 1 to 4 described above and will thus not be described in detail.

Figure 13A:
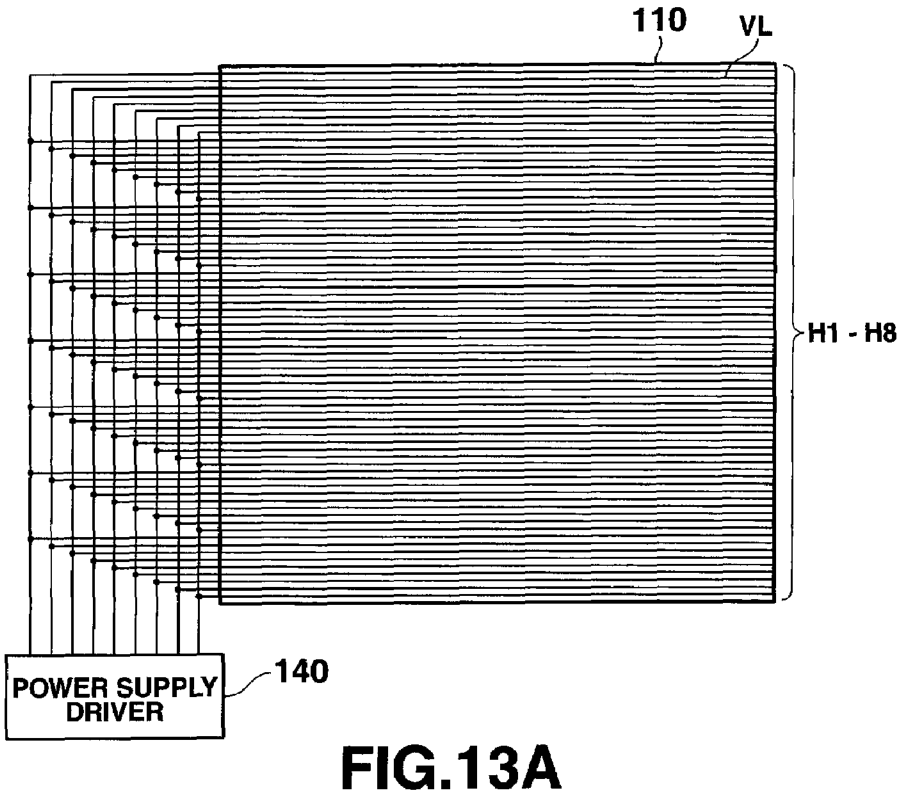
FIG. 13A is a diagram showing an example of the connection configuration of a plurality of power supply lines and a power supply driver in a display panel in a third embodiment of a display panel driving device according to the present invention.
Figure 13B:
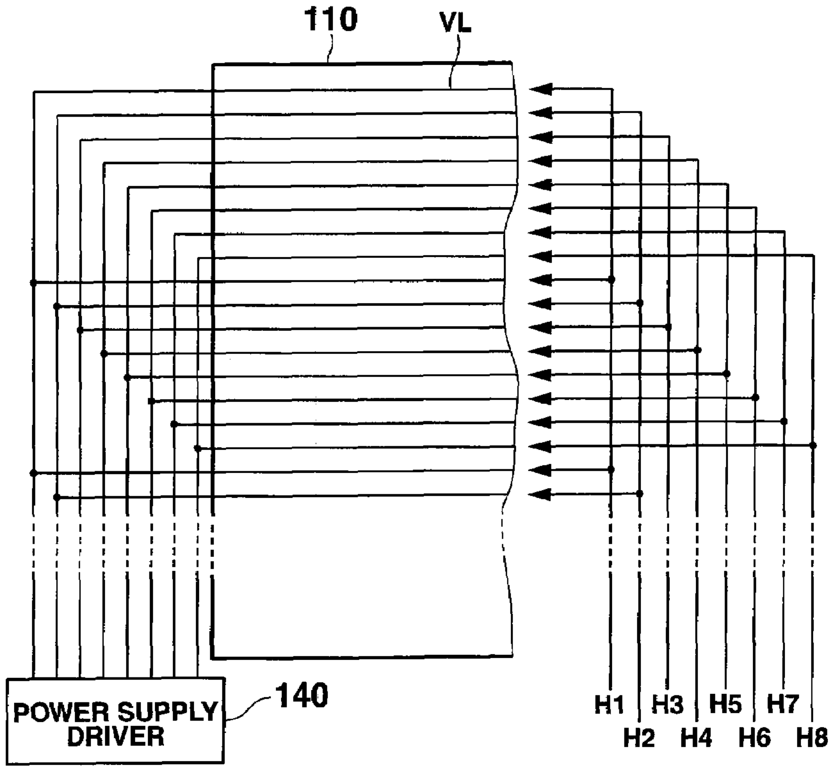
FIG. 13B is a diagram showing an example of the connection configuration of the plurality of power supply lines and power supply driver in the display panel.

FIGS. 13A and 13B are diagrams showing the connection configuration of a plurality of power supply lines VL in a display panel 110 and a power supply driver 140. FIG. 13A shows the entire connection configuration of the display panel 110 and the power supply driver 140. FIG. 13B is an enlarged view of a part of the connection configuration of the display panel 110 and the power supply driver 140 illustrating the configuration of partitioned display areas H1 to H8.

The display area of the display panel 110 is partitioned into the eight partitioned display areas H1 to H8 as is the case with the first and second embodiments. The same number of a plurality of power supply lines VL, for example, eight power supply lines VL, are arranged in each of the partitioned display areas H1 to H8.

Each of the partitioned display areas H1 to H8 in the above-described first and second embodiments is composed of a predetermined number of adjacent power supply lines VL. In contrast, each of the partitioned display areas H1 to H8 is composed of a predetermined number of power supply lines arranged away from one another as shown in FIG. 13B.

As shown in FIGS. 13A and 138, the power supply driver 140 has outputs the number of which corresponds to the number of the partitioned display areas, for example, eight outputs. One of the outputs of the power supply driver 140 is connected to all the power supply lines VL included in one of the partitioned display areas H1 to H8. That is, the first output of the power supply driver 140 is connected to the first power supply line VL, the ninth power supply line, and so on, included in the partitioned display area H1; the second output of the power supply driver 140 is connected to the second power supply line VL, the tenth power supply line, and so on, included in the partitioned display area H1; and so on.

Now, the driving control operation of the device configured as described above will be described.

Figure 14:
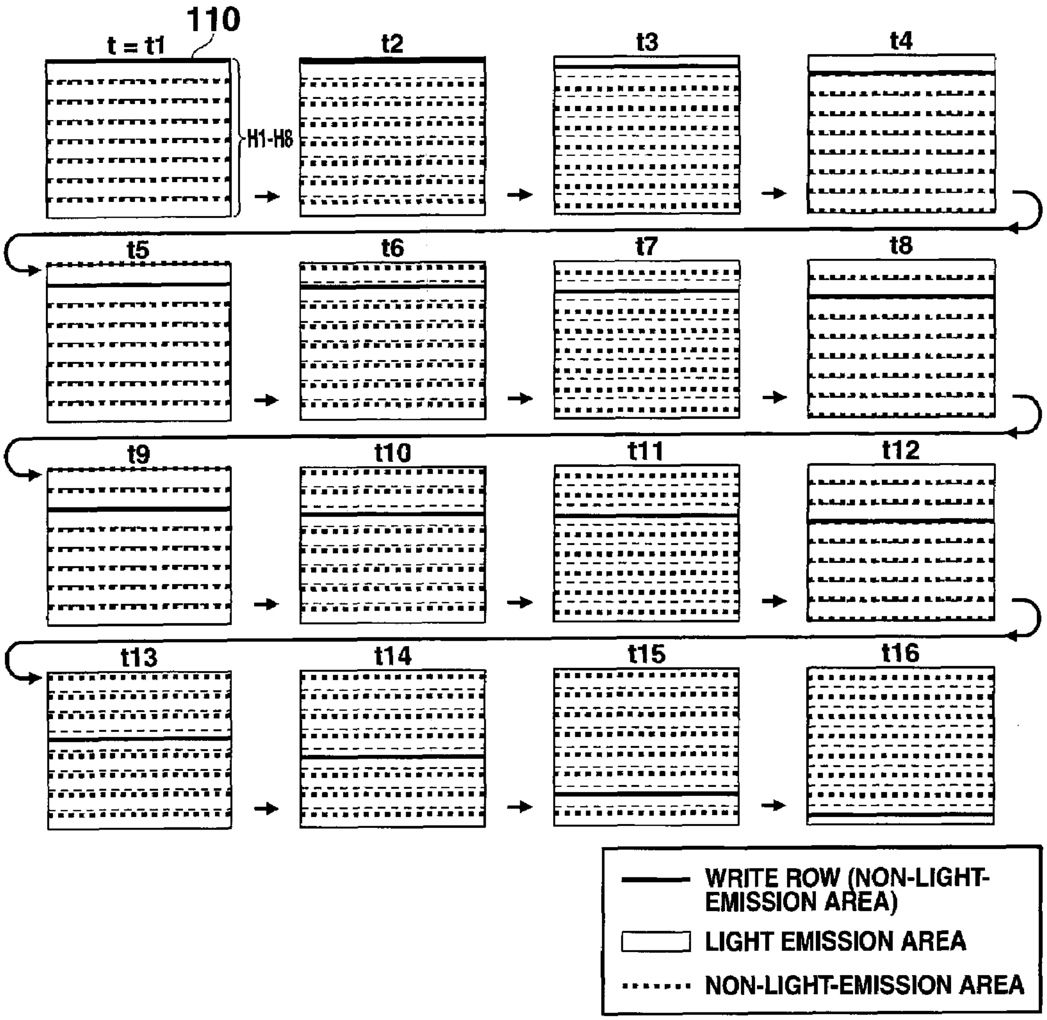
FIG. 14 is a diagram showing an example of the transition of a display state observed when the light emission of the display panel of the device is controlled at a 7/8 duty ratio.

FIG. 14 shows an example of the transition of the display state observed when the display panel 110 is controlled to emit light, for example, at a 7/8 duty ratio.

First, at time t1, the bit values of anode control data ASD are set to 01111111. Thus, organic electroluminescent elements OEL in one partitioned display area (first display area) H1 are set to a write operation state. The organic electroluminescent elements OEL in the second to eighth rows in the partitioned display area H1 are set to a non-light-emission operation state. Concurrently, the organic electroluminescent elements OEL in each of the rows in the seven other partitioned display areas (second display areas) H2 to H8 are set to a light emission operation state.

Then, at time t2, the bit values of the anode control data ASD are set to 10111111. Thus, the organic electroluminescent elements OEL in the first row in one partitioned display area H2 are set to the write operation state. The organic electroluminescent elements OEL in the second to eighth rows in the partitioned display area H1 are set to the non-light-emission operation state. Concurrently, the organic electroluminescent elements OEL in each of the rows in the seven other partitioned display areas H1 and H3 to H8 are set to the light emission operation state.

Then, at time t3, the bit values of the anode control data ASD are set to 11011111. Thus, the organic electroluminescent elements OEL in the first row in one partitioned display area H3 are set to the write operation state. The organic electroluminescent elements OEL in the second to eighth rows in the partitioned display area H3 are set to the non-light-emission operation state. Concurrently, the organic electroluminescent elements OEL in each of the rows in the seven other partitioned display areas H1, H2, and H4 to H8 are set to the light emission operation.

Thereafter, a similar operation is repeated. At time t4, the bit values of the anode control data ASD are set to 11111110. Thus, the organic electroluminescent elements OEL in the first row in one partitioned display area H8 are set to the write operation state. The organic electroluminescent elements OEL in the second to eighth rows in the partitioned display area H8 are set to the non-light-emission operation state. Concurrently, the organic electroluminescent elements OEL in each of the rows in the partitioned display areas H1 to H7 are set to the light emission operation state.

Then, between time t5 and time t8 following the completion of the write operation on the organic electroluminescent elements in the first row in each of the partitioned display areas H1 to H8, the bit values of the anode control data ASD are sequentially set to 01111111 to 11111110. Thus, the organic electroluminescent elements OEL in the second row in each of the partitioned display areas H1 to H8 are sequentially set to the write operation state. Concurrently, the organic electroluminescent elements OEL in the first and third to eighth rows in each of the partitioned display areas H1 to H8 are sequentially set to the non-light-emission operation state. The organic electroluminescent elements GEL in the other rows are set to the light emission operation state.

Then, between time t9 and time t12, the bit values of the anode control data ASD are sequentially set to 01111111 to 11111110. Thus, the organic electroluminescent elements OEL in the third row in each of the partitioned display areas H1 to H8 are sequentially set to the write operation state. Concurrently, the organic electroluminescent elements GEL in the first, second, and fourth to eighth rows in each of the partitioned display areas H1 to H8 are sequentially set to the non-light-emission operation state. The organic electroluminescent elements GEL in the other rows are set to the light emission operation state.

Similarly, the bit values of the anode control data ASD are sequentially changed and set. The organic electroluminescent elements GEL in each of the rows in each of the partitioned display areas H1 to H8 are sequentially repeatedly set to the write operation state or the non-light-emission operation state. Concurrently, the organic electroluminescent elements GEL in the other rows are repeatedly set to the light emission operation state.

Now, the driving control operation of controlling the light emission of the display panel 110 at a 1/8 duty ratio will be described.

Figure 15:
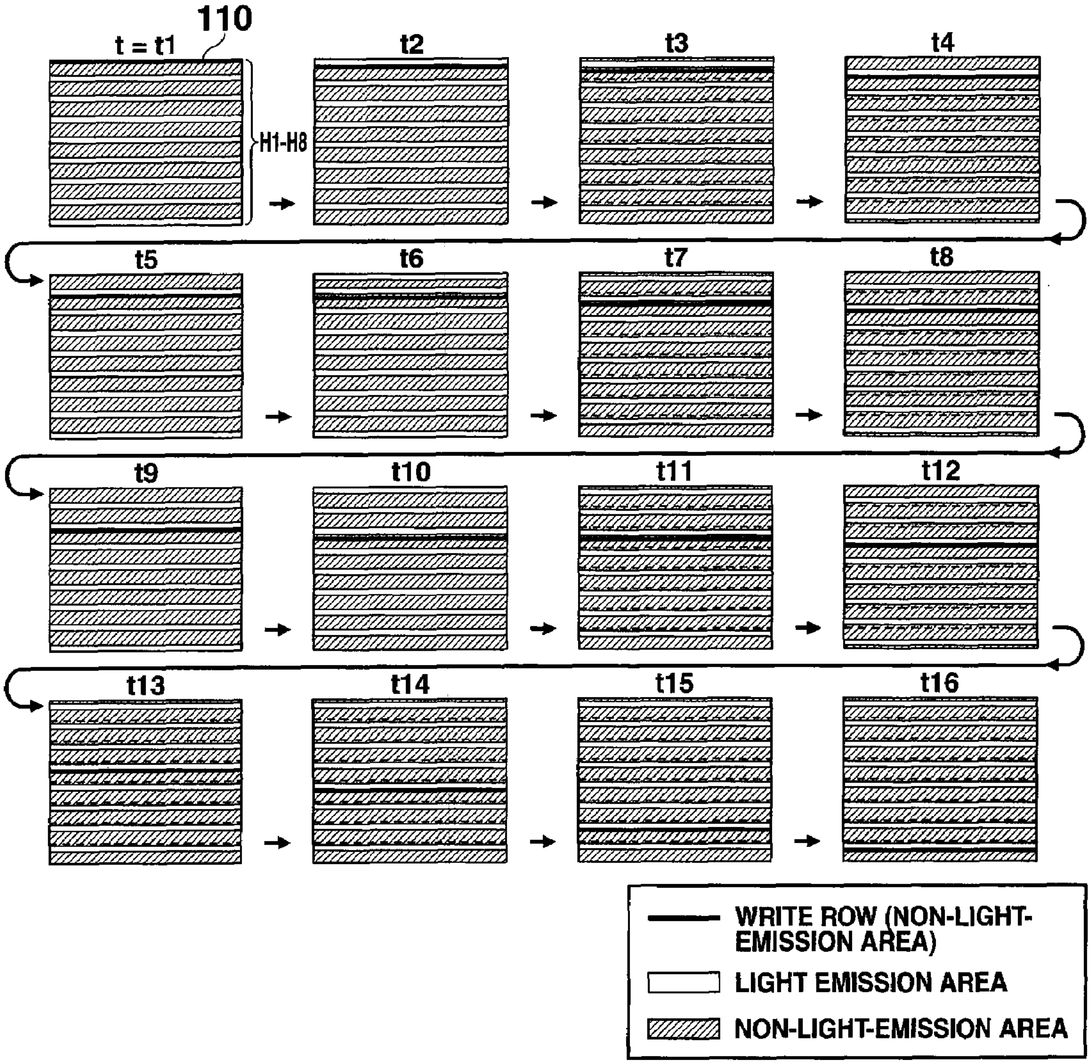
FIG. 15 is a diagram showing an example of the transition of the display state observed when the light emission of the display panel of the device is controlled at a 1/8 duty ratio.

FIG. 15 shows an example of the transition of the display state observed when the display panel 110 is controlled to emit light, for example, at a 1/8 duty ratio.

First, at time t1, the bit values of anode control data ASD are set to 00000001. Thus, the organic electroluminescent elements OEL in the first row in one partitioned display area (first display area) H1 are set to the write operation state. The organic electroluminescent elements OEL in the second to eighth rows in the partitioned display area H1 are set to a non-light-emission operation state. The organic electroluminescent elements OEL in each of the rows in six H2 to H7 of the seven other partitioned display areas (H2 to H8) are set to the non-light-emission operation state. Concurrently, the organic electroluminescent elements OEL in each of the rows in one partitioned display area H8 are set to the light emission operation state.

Then, at time t2, the bit values of the anode control data ASD are set to 10000000. Thus, the organic electroluminescent elements OEL in the first row in one partitioned display area H2 are set to the write operation state. The organic electroluminescent elements OEL in the second to eighth rows in the partitioned display area H2 are set to the non-light-emission operation state. The organic electroluminescent elements OEL in each of the rows in the six partitioned display areas H3 to H8 are set to the non-light-emission operation state. Concurrently, the organic electroluminescent elements OEL in each of the rows in one partitioned display area H1 are set to the light emission operation state.

Then, at time t3, the bit values of the anode control data ASD are set to 10000000. Thus, the organic electroluminescent elements OEL in the first row in one partitioned display area H3 are set to the write operation state. The organic electroluminescent elements OEL in the second to eighth rows in the partitioned display area H3 are set to the non-light-emission operation state. The organic electroluminescent elements OEL in each of the rows in the six partitioned display areas H1 and H4 to H8 are set to the non-light-emission operation state. Concurrently, the organic electroluminescent elements OEL in each of the rows in one partitioned display area H2 are set to the light emission operation state.

Thereafter, a similar operation is repeated. At time t4, the bit values of the anode control data ASD are set to 11111110. Thus, the organic electroluminescent elements OEL in the first row in one partitioned display area H8 are set to the write operation state. The organic electroluminescent elements OEL in the second to eighth rows in the partitioned display area H8 are set to the non-light-emission operation state. The organic electroluminescent elements OEL in each of the rows in the six partitioned display areas H1 to H6 are set to the non-light-emission operation. Concurrently, the organic electroluminescent elements OEL in each of the rows in one partitioned display area H7 are set to the light emission operation state.

Then, between time t5 and time t8 following the completion of the write operation on the organic electroluminescent elements in the first row in each of the partitioned display areas H1 to H8, the bit values of the anode control data ASD are sequentially set to 01111111 to 11111110. Thus, the organic electroluminescent elements OEL in the second row in each of the partitioned display areas H1 to H8 are sequentially set to the write operation state. Concurrently, the organic electroluminescent elements OEL in the first and third to eighth rows in each of the partitioned display areas H1 to H8 are sequentially set to the non-light-emission operation state. The organic electroluminescent elements OEL in the other rows are set to the light emission operation state.

Then, between time t9 and time t12, the bit values of the anode control data ASD are sequentially set to 01111111 to 11111110. Thus, the organic electroluminescent elements OEL in the third row in each of the partitioned display areas H1 to H8 are sequentially set to the write operation state. Concurrently, the organic electroluminescent elements OEL in the first, second, and fourth to eighth rows in each of the partitioned display areas H1 to H8 are sequentially set to the non-light-emission operation state. The organic electroluminescent elements OEL in the other rows are set to the light emission operation state.

Similarly, the bit values of the anode control data ASD are sequentially changed and set. The organic electroluminescent elements OEL in each of the rows in each of the partitioned display areas H1 to H8 are sequentially repeatedly set to the write operation state or the non-light-emission operation state. The organic electroluminescent elements OEL in the other rows are repeatedly set to the light emission operation state.

As described above, the third embodiment not only offers the characteristics of the above-described first embodiment but also distributes the rows to be set to the non-light-emission operation state and the rows to be set to the light emission operation state, over the partitioned display areas H1 to H8. Thus, like the above-described first embodiment, the above-described third embodiment enables the display luminance of the display panel 110 to be variably controlled between, for example, a 7/8 and a 1/8 duty ratio without the need to change display data. Furthermore, the third embodiment evenly distributes the rows to be set to the non-light-emission operation state and the rows to be set to the light emission operation state, within the display panel. This makes the boundary between a light emission area and a non-light-emission area difficult to view, allowing display quality to be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:

a display panel including a display area in which a plurality of display pixels are two-dimensionally arranged along a plurality of rows and a plurality of columns, to display image information based on display data;

a power supply driving section which applies, to each of the display pixels in the display area, one of a first power supply voltage and a second power supply voltage, wherein the first power supply voltage has a voltage value at which the display pixel is set to a non-display-operation state and the second power supply voltage has a voltage value at which the display pixel is set to a display operation state;

a selective driving section which sequentially applies a selection signal to each of the display pixels arranged in each of the rows in the display panel to sequentially set the display pixel to a selection state;

a data driving section which supplies a driving signal based on the display data to each of the display pixels; and a control section which controls the power supply driving section to set an area-ratio of a first area to a second area, wherein the first area is an area in the display area in which the display pixels to which the first power supply voltage is applied are arranged, and the second area is an area in which the display pixels to which the second power supply voltage is applied are arranged;

wherein:

the display area is partitioned into a plurality of partitioned display areas comprising the display pixels corresponding to a predetermined number of the rows fewer than the plurality of rows;

the power supply driving section applies one of the first power supply voltage and the second power supply voltage to the display pixels included in each of the partitioned display areas;

the control section sets a ratio of a number of the partitioned display areas to which the first power supply voltage is applied to a number of the partitioned display areas to which the second power supply voltage is applied, to a value based on the area-ratio;

when set to the selection state by the selective driving section, the display pixel is set to a write operation state in which the driving signal supplied by the data driving section is written to the display pixel;

the control section allows the power supply driving section to apply the first power supply voltage to a first display area comprising one of the plurality of partitioned display areas including the display pixels set to the write operation state, and to apply one of the first power supply voltage and the second power supply voltage to second display areas corresponding to the plurality of partitioned display areas except the first display area;

during a write period in which the driving signal is written to each of the display pixels included in the first display area, the control section allows the power supply driving section to apply, to at least one partitioned display area included in the second display areas, the first power supply voltage and the second power supply voltage at timings which do not overlap, and the control section sets a ratio of a first time to a second time based on the area-ratio; and the first time is a time for which the first power supply voltage is applied and the second time is a time for which the second power supply voltage is applied; and wherein each of the display pixels comprises:

a light emitting element; and a driving transistor including a current path, wherein a first end of the current path is connected to one end of the light emitting element, and a second end of the current path is applied with one of the first power supply voltage and the second power supply voltage, and wherein the light emitting element is supplied with a driving current corresponding to the display data via the current path.

2. The display device according to claim 1, wherein a value for the area-ratio is externally set.

3. The display device according to claim 1, further comprising:

a sensing section which senses a brightness of a surrounding environment, wherein the control section sets a value for the area-ratio according to the brightness of the surrounding environment sensed by the sensing section.

4. The display device according to claim 1, wherein each of the partitioned display areas comprises one of (i) the display pixels corresponding to a predetermined number of the rows arranged in the display panel adjacent to each other, and (ii) the display pixels corresponding to a predetermined number of the rows arranged in the display panel away from each other.

5. The display device according to claim 1, wherein the display panel includes a plurality of power supply lines provided along the respective rows and to which the power supply driving section applies one of the first power supply voltage and the second power supply voltage, each of the partitioned display areas includes the predetermined number of power supply lines corresponding to the predetermined number of rows, and the power supply driving section applies the first power supply voltage or the second power supply voltage to the predetermined number of power supply lines in each of the partitioned display areas.

6. A driving control method for a display device comprising:

providing a display panel including a display area in which a plurality of display pixels are two-dimensionally arranged along a plurality of rows and a plurality of columns, to display image information based on display data;

writing a driving signal based on the display data to the display pixels which were set to a selection state;

applying, as a power supply voltage to the plurality of display pixels in the display area, one of a first power supply voltage and a second power supply voltage, wherein the first power supply voltage has a voltage value at which each of the display pixels is set to a non-display-operation state and the second power supply voltage has a voltage value at which each of the display pixels is set to a display operation state; and setting an area-ratio of a first area to a second area in the display area, wherein the first area is an area in which the display pixels to which the first power supply voltage is applied are arranged and the second area is an area in which the display pixels to which the second power supply voltage is applied are arranged;

wherein the display area is partitioned into a plurality of partitioned display areas comprising the display pixels corresponding to a predetermined number of the rows fewer than the plurality of rows, and during a write period in which the driving signal is written to each of the display pixels which were set to the selection state and included in one of partitioned display areas, the first power supply voltage and the second power supply voltage are supplied to at least one of the partitioned display areas including none of the display pixels which were set to the selection state at timings which do not overlap, and a ratio of a first time to a second time is set based on the area-ratio;

wherein the first time is a time for which the first power supply voltage is applied and the second time is a time for which the second power supply voltage is applied; and wherein each of the display pixels comprises:

a light emitting element; and a driving transistor including a current path, wherein a first end of the current path is connected to one end of the light emitting element, and a second end of the current path is applied with one of the first power supply voltage and the second power supply voltage, and wherein the light emitting element is supplied with a driving current corresponding to the display data via the current path.

7. A display device comprising:

a display panel including a display area in which a plurality of display pixels are two-dimensionally arranged along a plurality of rows and a plurality of columns, to display image information based on display data, the display area being partitioned into a plurality of partitioned display areas each comprising the display pixels corresponding to a predetermined number of rows fewer than the plurality of rows;

a selective driving section which sequentially sets the display pixels in each row in the display panel, to a selection state;

a data driving section which supplies a driving signal based on the display data to each of the display pixels;

a power supply driving section which applies, to the plurality of display pixels in the display area, one of a first power supply voltage and a second power supply voltage, wherein the first power supply voltage has a voltage value at which each of the display pixels is set to a non-display-operation state, and the second power supply voltage has a voltage value at which each of the display pixels is set to a display operation state; and a control section which controls the power supply driving section, wherein the display pixel is set to a write operation state in which the driving signal supplied by the data driving section is written when the display pixel was set to the selection state by the selective driving section, wherein the control section allows the power supply driving section to apply the first power supply voltage to a first display area comprising one of the plurality of partitioned display areas including the display pixels which are set to the write operation state, wherein during a write period when the driving signal is written to each of the display pixels included in the first display area, the control section allows the power supply driving section to apply the first power supply voltage and the second power supply voltage at timings which do not overlap, to at least one particular partitioned display area included in second display areas corresponding to the plurality of partitioned display areas except the first display area, wherein throughout the write period, the control section allows the power supply driving section to apply one of the first power supply voltage and the second power supply voltage to the display pixels in a third display area corresponding to the second display areas except the particular partitioned display area, and wherein the control section sets a ratio of a first time to a second time, wherein the first time is a time for which the first power supply voltage is applied to the particular partitioned display area and the second time is a time for which the second power supply voltage is applied to the particular partitioned display area, and the control section sets an area-ratio of a first area to a second area, wherein the first area is an area in which the display pixels in the third display area to which the first power supply voltage is applied are arranged and the second area is an area in which the display pixels in the third display area to which the second power supply voltage is applied are arranged.

8. The display device according to claim 7, wherein each of the partitioned display areas comprises one of (i) the display pixels corresponding to a predetermined number of the rows arranged in the display panel adjacent to each other, and (ii) the display pixels corresponding to a predetermined number of rows arranged in the display panel away from each other.

9. The display device according to claim 7, wherein a value for the area-ratio is externally set.

10. The display device according to claim 7, further comprising:

a sensing section sensing brightness of a surrounding environment, wherein the control section sets the value for the area-ratio according to the brightness of the surrounding environment sensed by the sensing section.

11. The display device according to claim 7, wherein each of the display pixels comprises:

a light emitting element; and a driving transistor including a current path, wherein a first end of the current path is connected to one a first end of the light emitting element and a second end of the current path is connected to the power supply line, wherein a second end of the light emitting element is set to a fixed potential, and wherein the light emitting element is supplied with a driving current corresponding to the display data via the current path.

12. A driving control method for a display device comprising:

providing a display panel including a display area in which a plurality of display pixels are two-dimensionally arranged along a plurality of rows and a plurality of columns, to display image information based on display data, the display area being partitioned into a plurality of partitioned display areas each comprising the display pixels corresponding to a predetermined number of rows fewer than the plurality of rows;

setting the display pixels in a selection state, to a write state and writing a driving signal based on the display data, to the display pixels;

applying, to a first display area comprising one of the plurality of partitioned areas including the display pixels which are set to the write operation state, a first power supply voltage including a voltage value at which the display pixels are set to a non-display-operation state;

then during a write period in which the driving signal is written to the display pixels included in the first display area, applying the first power supply voltage and a second power supply voltage including a voltage value at which the display pixels are set to a display operation state at timings which do not overlap, to at least one particular partitioned display area included in second display areas corresponding to the plurality of partitioned display areas except the first display area;

then throughout the write period, applying one of the first power supply voltage and the second power supply voltage to the display pixels in a third display area corresponding to the second display areas except the particular partitioned display area; and setting a ratio of a first time to a second time, wherein the first time is a time for which the first power supply voltage is applied to the particular partitioned display area and the second time is a time for which the second power supply voltage is applied to the particular partitioned display area, and setting an area-ratio of an first area to a second area, wherein the first area is an area in which the display pixels in the third display area to which the first power supply voltage is applied are arranged and the second area is an area in which the display pixels in the third display area to which the second power supply voltage is applied are arranged.

13. A display device comprising:

a display panel including a display area in which a plurality of display pixels are two-dimensionally arranged along a plurality of rows and a plurality of columns, to display image information based on display data;

a power supply driving section which applies, to each of the display pixels in the display area, one of a first power supply voltage and a second power supply voltage, wherein the first power supply voltage has a voltage value at which the display pixel is set to a non-display-operation state and the second power supply voltage has a voltage value at which the display pixel is set to a. display operation state;

a selective driving section which sequentially applies a selection signal to each of the display pixels arranged in each of the rows in the display panel to sequentially set the display pixel to a selection state;

a data driving section which supplies a driving signal based on the display data to each of the display pixels; and a control section which controls the power supply driving section;

wherein:

the display area is partitioned into a plurality of partitioned display areas comprising the display pixels corresponding to a predetermined number of the rows fewer than the plurality of rows, when set to the selection state by the selective driving section, the display pixel is set to a write operation state in which the driving signal supplied by the data driving section is written to the display pixel;

the power supply driving section applies one of the first power supply voltage and the second power supply voltage to each of the display pixels included in each of the partitioned display areas;

the control section allows the power supply driving section to apply the first power supply voltage to a first display area comprising one of the partitioned display areas in the plurality of partitioned display areas including the display pixels set to the write operation state;

the control section allows the power supply driving section to apply one of the first power supply voltage and the second power supply voltage to a second display area corresponding to a plurality of partitioned display areas except the first display area;

the control section sets an area-ratio of a first area and a second area in the display area, wherein the first area is an area in which the display pixels to which the first power supply voltage is applied are arranged, and the second area is an area in which the display pixels to which the second power supply voltage is applied are arranged;

during a write period in which the driving signal is written to each of the display pixels, the control section allows the power supply driving section to apply, to at least one partitioned display area included in the second display areas, the first power supply voltage and the second power supply voltage at timings which do not overlap, and the control section sets a ratio of a first time to a second time based on the area-ratio, wherein the first time is a time for which the first power supply voltage is applied and the second time is a time for which the second power supply voltage is applied.

14. A driving control method for a display device comprising:

providing a display panel including a display area in which a plurality of display pixels are two-dimensionally arranged along a plurality of rows and a plurality of columns, to display image information based on display data, wherein the display area is partitioned into a plurality of partitioned display areas comprising the display pixels corresponding to a predetermined number of the rows fewer than the plurality of rows;

writing a driving signal based on the display data to the display pixels which were set to a selection state;

applying, to the plurality of display pixels in the display area, one of a first power supply voltage and a second power supply voltage, wherein the first power supply voltage has a voltage value at which each of the display pixels is set to a non-display-operation state and the second power supply voltage has a voltage value at which each of the display pixels is set to a display operation state;

setting an area-ratio of a first area to a second area in the display area, wherein the first area is an area in which the display pixels to which the first power supply voltage is applied are arranged, and the second area is an area in which the display pixels to which the second power supply voltage are arranged; and setting a ratio of a first time to a second time based on the area-ratio, wherein the first time is a time for which the first power supply voltage is applied and the second time is a time for which the second power supply voltage is applied, during a write period for writing the driving signal to each of the display pixels which were set to the selection state and included in one of the partitioned display areas, and wherein the first power supply voltage and the second power supply voltage are supplied to at least one of the partitioned display areas including none of the display pixels which were set to the selection state at timings which do not overlap.

* * * * *